United States Patent [19]

Aoki

[11] Patent Number: 5,509,091
[45] Date of Patent: Apr. 16, 1996

[54] DOT-MATRIX DATA PRODUCING APPARATUS

[75] Inventor: Kazuma Aoki, Kasugai, Japan

[73] Assignee: Brother Kogyo Kabushiki Kaisha, Nagoya, Japan

[21] Appl. No.: 274,762

[22] Filed: Jul. 14, 1994

[30] Foreign Application Priority Data

Jul. 28, 1993 [JP] Japan .................................. 5-186107

[51] Int. Cl.$^6$ ........................................................ G06K 9/42
[52] U.S. Cl. ............................................................ 382/298
[58] Field of Search ........................ 382/298; 345/127–131

[56] References Cited

U.S. PATENT DOCUMENTS

| | | | |
|---|---|---|---|
| 4,675,830 | 6/1987 | Hawkins | 364/518 |
| 4,785,391 | 11/1988 | Apley et al. | 364/518 |
| 4,897,638 | 1/1990 | Kokunishi et al. | 340/751 |
| 5,050,228 | 9/1991 | Yoshida et al. | 382/55 |
| 5,295,240 | 3/1994 | Kajimoto | 395/151 |

Primary Examiner—Jose L. Couso
Attorney, Agent, or Firm—Oliff & Berridge

[57] ABSTRACT

A dot-matrix data producing apparatus including a first device for transforming, according to scale data indicative of a scale of an output character within a first range of scale values, original outline data including original width data indicative of an original width of a reference stroke of an original character, into transformed outline data including first transformed width data indicative of a first transformed width of the reference stroke, according to a first relationship between transformed width values and scale values wherein the transformed width values increase as the scale values increase; a second device for transforming, according to the scale data indicative of the output-character scale within a second range smaller than the first range, the original outline data into transformed outline data including second transformed width data indicative of a second transformed width of the reference stroke, according to a second relationship between one or more transformed width values and the second-range scale values wherein each of the one or more transformed width values corresponds to the scale values within a corresponding one of one or more sub-ranges of scale values within the second range of scale values; and a third device for producing dot-matrix data from the transformed outline data including the first or second transformed width data.

35 Claims, 22 Drawing Sheets

OUTLINE DATA

DATA NUMBER: 10

POINT DATA: (x0,y0) | (x1,y1) | (x2,y2) | (x3,y3) | (x4,y4) | (x5,y5) | (x6,y6) | (x7,y7) | (x8,y8) | (x9,y9)

FIG. 4(a)

LINE-SPACING DATA

X DATA NUMBER: 1

X LINE-SPACING DATA: (X11,X12,Xw1)

Y DATA NUMBER: 2

Y LINE-SPACING DATA: (Y11,Y12,Yw1) | (Y21,Y22,Yw2)

| OUTPUT SIZES (POINTS) $\alpha$ | ORIGINAL SPACING DATA $\beta$ | CORRECTED SPACING DATA |
|---|---|---|
| $0 \leq \alpha < 14$ | $0 \leq \beta < 20$ | 1 |
| $14 \leq \alpha < 20$ | $0 \leq \beta < 10$ | 1 |
| | $10 \leq \beta < 20$ | 2 |
| $20 \leq \alpha < 26$ | $0 \leq \beta < 7$ | 1 |
| | $7 \leq \beta < 10$ | 2 |
| | $10 \leq \beta < 15$ | 3 |

FIG. 7

| OUTPUT SIZES α (POINTS) | ORIGINAL SPACING DATA β | CORRECTED SPACING DATA |
|---|---|---|
| $0 \leq \alpha < 14$ | $0 \leq \beta < 20$ | 1 |
| $14 \leq \alpha < 20$ | $0 \leq \beta < 10$ | 1 |
| | $10 \leq \beta < 20$ | 11 |
| $20 \leq \alpha < 26$ | $0 \leq \beta < 7$ | 1 |
| | $7 \leq \beta < 10$ | 8 |
| | $10 \leq \beta < 15$ | 13 |

FIG. 12(a)

| OUTLINE DATA | | | | | | | | | | | | | | | | | | | | | |
|---|---|---|---|---|---|---|---|---|---|---|---|---|---|---|---|---|---|---|---|---|---|
| NUMBER OF POINTS | 20 | | | | | | | | | | | | | | | | | | | | |
| NUMBER OF OUTLINES | 1 | | | | | | | | | | | | | | | | | | | | |
| X COORDINATES | x0 | x1 | x2 | x3 | x4 | x5 | x6 | x7 | x8 | x9 | x10 | x11 | x12 | x13 | x14 | x15 | x16 | x17 | x18 | x19 |
| Y COORDINATES | y0 | y1 | y2 | y3 | y4 | y5 | y6 | y7 | y8 | y9 | y10 | y11 | y12 | y13 | y14 | y15 | y16 | y17 | y18 | y19 |
| SORTS OF POINT | L | L | L | A | A | B | A | A | B | L | L | L | A | A | B | A | A | B | L | L |
| END POINT | 0 | 0 | 0 | 0 | 0 | 0 | 0 | 0 | 0 | 0 | 0 | 0 | 0 | 0 | 0 | 0 | 0 | 0 | 0 | 1 |

| NUMBER | 2 | wxl0 | wxl1 |
|---|---|---|---|
| DATA | | wxh0 | wxh1 |
| NUMBER | 0 | | |
| DATA | | | |
| X LINE SPACING DATA | | | |
| Y LINE SPACING DATA | | | |

| NUMBER | SORTS OF DATA | ORIGINAL COORDINATES | TARGET COORDINATES | CORRECTED COORDINATES | a | b |
|---|---|---|---|---|---|---|
| 0 | LINE SPACING DATA 0 | wxl0 | Twxl0 | HTwxl0 | | |
| 1 | LINE SPACING DATA 0 | wxh0 | Twxh0 | HTwxh0 | | |
| 2 | LINE SPACING DATA 1 | wxl1 | Twxl1 | HTwxl1 | | |
| 3 | LINE SPACING DATA 1 | wxh1 | Twxh1 | HTwxh1 | | |
| 4 | — | — | — | — | | |

FIG. 14

| NUMBER | SORTS OF DATA | ORIGINAL COORDINATES | TARGET COORDINATES | CORRECTED COORDINATES | a | b |
|---|---|---|---|---|---|---|
| 0 | LINE SPACING DATA 0 | wxl0 | Twxl0 | HTwxl0 | | |
| 1 | LINE SPACING DATA 0 | wxh0 | Twxh0 | HTwxh0 | a1 | b1 |
| 2 | LINE SPACING DATA 1 | wxl1 | Twxl1 | HTwxl1 | a2 | b2 |
| 3 | LINE SPACING DATA 1 | wxh1 | Twxh1 | HTwxh1 | a3 | b3 |
| 4 | — | — | — | — | a4 | b4 |

DOT-MATRIX DATA PRODUCING APPARATUS

BACKGROUND OF THE INVENTION

1. Field of the Invention

The present invention relates to an apparatus for producing dot data or dot-matrix data from outline data defining one or more outlines of a character.

2. Related Art Statement

There is known a data processing device which processes outline data including a plurality of sets of point data, i.e., sets of x and y coordinates which cooperate with each other to define, in the x-y coordinate system, one or more outlines of a character (e.g., letter, numeral, symbol, figure, etc.). The data processing device produces dot-matrix data from the outline data, so that an output device such as a printer or an image display outputs the character according to the dot-matrix data. The dot-matrix data include (a) a plurality of sets of "ON" data (or "OFF" data) defining the inside area of the output character and (b) a plurality of sets of "OFF" data (or "ON" data) defining the outside area of the output character. Each set of "ON" or "OFF" data corresponds to a unit area of the x-y coordinate system or plane, on one hand, and corresponds to a picture element of the output character, on the other hand.

The process of producing dot-matrix data from outline data may easily be understood by assuming a picture-element screen 24, as shown in FIG. 3, which conceptionally defines the picture elements of an output character to be produced by the output device. The picture-element screen 24 is constituted by (a) a number of straight lines extending parallel to a Y axis and passing through respective integral coordinates of an X axis which is perpendicular to the Y axis and cooperates with the Y axis to provide a two-dimensional coordinate system, and (b) a number of straight lines extending parallel to the X axis and passing through respective integral coordinates of the Y axis. In this case, each picture element of the output character corresponds to a square unit area defined by (a) two adjacent straight lines parallel to the Y axis and (b) two adjacent straight lines parallel to the X axis, and those four straight lines provide the four boundary lines of the square unit area.

A raster-scanning method using a picture-element screen is used for producing dot-matrix data from outline data. This method will be described in detail by reference to the outline data of a character "H" shown in FIG. 17. First, the outline data, or outline defined thereby, are assumed to be superposed on a picture-element screen. Next, a single straight scanning line is assumed to extend parallel to the X or Y axis and pass through the centers of square unit areas of the picture-element screen, i.e., picture elements of an output character. Subsequently, all the intersecting point or points of the scanning line and the character outline is/are determined. Based on the position or positions of the intersecting point or points, a set of "ON" or "OFF" data is produced for each of the square unit areas currently under the scanning line, according to a predetermined rule, so that one or more sets of "ON" data substantially define the inside area of the character outline and one or more sets of "OFF" data substantially define the outside area of the character outline. The predetermined rule may be such that if the center of each square unit area falls within the inside area of the character outline, that unit area is defined by a set of "ON" data and, if not, that unit area is defined by a set of "OFF" data. Thus, one raw or one column of the dot-matrix data is produced. By repeating this operation moving the scanning line all over the picture-element screen in a direction parallel to the Y or X axis, the entire dot-matrix data are produced for the character as a whole. In this way, the dot-matrix data are produced from the outline data.

Alternatively, after the original outline data have been transformed into transformed outline data defining a transformed outline having a changed size, the transformed outline data may be converted into dot-matrix data in the same manner as described above. In this case, it is possible to produce various sizes of transformed outlines or output characters from a single set of original outline data. Since outline data are more compact than dot-matrix data, a number of sets of outline data for a number of characters are advantageously stored in a memory of a smaller storage capacity. The process of changing the size of an original outline or character defined by original outline data will be described by reference to the outline data of character "H" of FIG. 17. This process may be performed by transforming the sets of point data, i.e., sets of x and y coordinates of the original outline data in such a way that each of the picture elements of an output character corresponds to a square unit area whose four vertices are defined by two adjacent transformed x integral coordinates and two adjacent transformed y integral coordinates.

Assuming that a desired size of the output character be selected at a value, p (points; p=1 is equal to 1/72 inch), by an operator or user through an input device such as a keyboard, that the picture-element resolution of the output device be specified at a value, d (dots per inch), and that the original size of the character be defined at a value, e, by the original outline data, then a transformation coefficient, Z, for the above coordinate transformation is obtained by the following expression:

$$Z=(p \times d)/(I \times e)$$

where

I is a constant, i.e., 72 (points per inch).

In the case where the picture-element resolution d is equal to the constant I, i.e., 72, the above expression becomes more simple: Z=p/e. The transformation coefficient defines a scale of the output character.

Additionally, the operator may input, through the input device, data indicative of a desired position of the output character, i.e., parallel-translation amount of the output character with respect to the X and/or Y axis. Therefore, this coordinate transformation is generally expressed by the following transformation function, i.e., linear function:

$$v'=Z \times v + T$$

where

Z is the transformation coefficient with respect to the X and/or Y axis;

T is the parallel-translation amount with respect to the X and/or Y axis;

v is each of the x and/or y coordinates of the original outline data; and v' is a corresponding one of the x and/or y coordinates of the transformed outline data.

Hereinafter, the original outline data are referred to as the "outline data A" and the transformed outline data are referred to as the "outline data B".

If the outline data B are superposed on a picture-element screen 124 as shown in FIG. 18, and subsequently the outline data B are subjected to the raster-scanning method to produce dot-matrix data, the dot-matrix data produced may suffer low quality because quantization errors may occur when the outline data B are converted into the dot-matrix data. Assuming that each of two vertical strokes 21, 22 of the original character "H" of FIG. 17 have an original width of 14 (=Ww1 or Ww2) and that the original outline be transformed according to a scale (=p/e) of 1/10, the prior data processing device produces, from the outline data B, the dot-matrix data including sets of "ON" data indicated by hatching in FIG. 18, by the raster-scanning method, in the case where the resolution d is equal to the constant I. As can been seen from FIG. 18, the two vertical strokes of a dot image defined by the dot-matrix data have different widths (i.e., two-dot width and one-dot width) whereas the two counterparts of the transformed outline defined by the outline data B have the same width (=1.4). Thus, the dot image, i.e., output character may give a strange impression to observers.

For solving the above problem, it has been practiced to automatically adjust the width of a vertical or horizontal stroke of a transformed outline, i.e., distance between the two opposed outline segments of the vertical or horizontal stroke, and thereby control the number of picture elements to be located between the two outline segments of the vertical or horizontal stroke. One of the known methods will be described below.

First, line-spacing data are prepared which include (a) point data including two x or y coordinates defining a vertical or horizontal stroke to be adjusted and (b) spacing data defining the distance between the two coordinates. However, the preparation of (b) the spacing data may not be necessary, because the spacing data may be automatically produced from (a) the position data. Additionally, in the case where (b) the spacing data are prepared, (a) the position data may consist of only one x or y coordinate. In either case, the line-spacing data provide original width data defining the original width of the vertical or horizontal stroke. A set of x line-spacing data for a vertical stroke may include (a) x position data including two x coordinates and (b) x spacing data defining the distance between the two x coordinates. Similarly, a set of y line-spacing data for a horizontal stroke may include (c) y position data including two y coordinates and (d) y spacing data defining the distance between the two y coordinates. FIG. 17 shows the outline data A of character "H" for which two sets of x line-spacing data have been prepared for the two vertical strokes 21, 22 and one set of y line-spacing data has been prepared for a horizontal stroke 23.

Second, the line-spacing data are transformed according to a desired size p of the output character. Regarding the character "H" of FIG. 17, the two x coordinates of each of the two sets of x line-spacing data 21, 22 are transformed by the same manner as used for the coordinate transformation of the outline data A into the outline data B, and the distance or width defined by the x spacing data of each set of x line-spacing data 21, 22 is multiplied by the transformation coefficient Z, and then is rounded by counting fractions of 0.5 and over as one and cutting away the rest, or otherwise cutting away all fractions smaller than one. The thus obtained width will be referred to as the "dot width". The dot width corresponds to an integral number of dots, i.e., picture elements of the output character.

Third, the transformed line-spacing data are corrected according to the flow chart of FIG. 20. Initially, at Step S51, one of the two transformed coordinates of each transformed set of x or y line-spacing data which one transformed coordinate has a smaller distance up to an x or y integral coordinate nearest thereto than that of the other transformed coordinate, is selected as a base coordinate, and the other transformed coordinate is selected as a dependent coordinate. At Step S52, the base coordinate is moved, i.e., rounded to that integral coordinate nearest thereto, which provides a corrected base coordinate. Otherwise, a smaller one of the two transformed coordinates may be selected as a base coordinate and be rounded to an integral coordinate as a corrected base coordinate by cutting away all fractions smaller than one. Then, at Step S53, a dot width for the two transformed coordinates is determined as described above. Subsequently, at Step S54, all the x or y coordinates of the outline data B equal to the base coordinate are corrected or moved to the corrected base coordinate, and at Step S55 all the x or y coordinates of the outline data B equal to the dependent coordinate are corrected or moved to an integral x or y coordinate distant from the corrected base coordinate by the dot width.

Supposing that a set of line-spacing data be expressed by three values, (coordinate 1, coordinate 2, width value), the original outline A of character "H" of FIG. 17 include the set of x line-spacing data, (W11, W12, Ww1), for the vertical stroke 21; the set of x line-spacing data, (W21, W22, Ww2), for the vertical stroke 22; and the set of y line-spacing data, (U11, U12, Uw1), for the horizontal stroke 23. The values W11, W12, W21, W22 are x coordinates; the values U11, U12 are y coordinates; and all the width values Ww1, Ww2, Uw1 are equal to 14.

FIG. 19 shows outline data C obtained by correcting the outline data B as described above. Reference numeral 41 designates the transformed outline defined by the outline data B, and numeral 42 designates a corrected outline defined by the outline data C. For example, regarding the transformed set of x line-spacing data, (W11a, W12a, Ww1a), for the vertical stroke 21, one transformed x coordinate W11a that is nearer to an x integral coordinate, wb, nearest thereto than the other transformed x coordinate W12a, the value W11a is selected as the base coordinate and the value W12a is selected as the dependent coordinate, at Step S51 of FIG. 20. At the following Step S52, the x integral coordinate wb nearest to the base coordinate W11a is determined as the corrected base coordinate. Subsequently, at Step S53, a dot width is determined by rounding the transformed width value Ww1a, i.e., counting fractions of 0.5 and over as one and cutting away the rest. Since the original width value Ww1=14 is reduced according to the scale (=p/e) of 1/10 and the resolution d is equal to the constant I, the transformed width value Ww1a is equal to 1.4, therefore it is rounded to 1. At Step S54, all the transformed x coordinates of the outline data B equal to the base coordinate W11a are corrected or moved to the corrected base coordinate, i.e., x integral coordinate wb. Subsequently, at Step S55, all the transformed x coordinates of the outline data B equal to the dependent coordinate W12a are corrected or moved to an x integral coordinate, wb+1. Thus, the correction of the transformed set of x line-spacing data for the vertical stroke 21 is ended. Similarly, the set of x line-spacing data for the vertical stroke 22 and the transformed set of y line-spacing data for the horizontal stroke 23 are corrected. The two vertical strokes and one horizontal stroke of the corrected outline 42 defined by the outline data C have the same dot with, so that the dot-matrix data produced from the outline data C enjoy high quality and the output character produced according to the dot-matrix data gives a good impression to observers.

However, the above-described prior data processing method suffer from a problem that a small difference of the respective original widths of two strokes of a character may be amplified into the difference of one dot, i.e., one picture element of an output character. This may lead to lowering the quality of the output character in particular in the case where a selected size p of the output character is small and/or the picture-element resolution d of the output character is low, because in those cases the ratio of one picture element relative to the whole output character is great. For example, assuming that a horizontal stroke 61 of a character "F" of FIG. 2 have the original width of 15 and each of a horizontal stroke 62 and a vertical stroke 63 of the same have the original width of 14, the original outline data of character "F" are converted into dot-matrix data indicated by hatching in FIG. 21, under the same conditions as described above for the conversion of the original outline data of character "H" of FIG. 17.

In the prior method, the difference, one, between the original width values, 15 and 14, of the horizontal stroke 61 and the horizontal stroke 62 or vertical stroke 63 is amplified into the difference of one picture element of an output character 72 via a transformed outline 71. Thus, the output character suffers low quality. On the other hand, in the case where a selected size p of the output character is large and/or the picture-element resolution d of the output character is high, the ratio of one picture element relative to the whole output character is small. In the latter case, the output character effectively reflects the original small difference between the stroke width values, thereby enjoying a good visual balance between the two or more strokes. Thus, the original small difference between the stroke width values should not be eliminated from the original outline data.

SUMMARY OF THE INVENTION

It is therefore an object of the present invention to provide an apparatus which produces, from outline data, dot-matrix data with high quality, irrespective of a desired size of an output character.

The above object has been achieved by the present invention, which provides an apparatus for transforming original outline data defining at least one original outline of an original character, according to scale data indicative of a scale of an output character corresponding to the original character, into transformed outline data defining at least one transformed outline of the output character, and for producing dot-matrix data from the transformed outline data, the apparatus comprising: (a) first transforming means for transforming, according to the scale data indicative of the scale of the output character within a first range of scale values, the original outline data including at least one set of original width data indicative of an original width of a reference stroke of the original character defined by two opposed segments of the at least one original outline of the original character, into the transformed outline data including at least one set of first transformed width data indicative of a first transformed width of the reference stroke, according to a first relationship between transformed width values and scale values wherein the transformed width values increase as the scale values increase; (b) second transforming means for transforming, according to the scale data indicative of the scale of the output character within a second range of scale values smaller than the first range of scale values, the original outline data including the at least one set of original width data into the transformed outline data including at least one set of second transformed width data indicative of a second transformed width of the reference stroke, according to a second relationship between at least one transformed width value and the second-range scale values wherein each of the at least one transformed width value corresponds to the scale values within a corresponding one of at least one sub-range of scale values within the second range of scale values; and (c) dot-matrix data producing means for producing the dot-matrix data from the transformed outline data including the first or second transformed width data, according to a predetermined rule, the dot-matrix data including a plurality of sets of inside data substantially defining an inside area of the transformed outline of the output character defined by the transformed outline data and a plurality of sets of outside data substantially defining an outside area of the transformed outline of the output character. The scale data may comprise at least one of (a) size data indicative of a size, p, of the output character and (b) resolution data indicative of a picture-element resolution, d, of the output character. In the case where the resolution d and the original size, e, of the character are pre-determined, the above-described transformation coefficient Z is defined by only the character's output size p. Since the scale of the output character is defined by the coefficient Z, the size data indicative of the character's output size p provide the scale data indicative of the scale of the output character.

In the dot-matrix data producing apparatus constructed as described above, the first transforming means transforms, according to scale data indicative of a scale of an output character within a first range of scale values, original outline data including at least one set of original width data indicative of an original width of a reference stroke of an original character defined by two opposed segments of at least one original outline of the original character, into transformed outline data including at least one set of first transformed width data indicative of a first transformed width of the reference stroke, according to a first relationship between transformed width values and scale values wherein the transformed width values increase as the scale values increase, i.e., the transformed width values decrease as the scale values decrease. The first transforming means is known in the art as described previously, though the known transforming means operates according to all the scale values. The present apparatus additionally comprises the second transforming means for transforming, according to scale data indicative of a scale of an output character within a second range of scale values smaller than the first range of scale values, the original outline data including the at least one set of original width data into transformed outline data including at least one set of second transformed width data indicative of a second transformed width of the reference stroke, according to a second relationship between at least one transformed width value and the second-range scale values wherein each of the at least one transformed width value corresponds to the scale values within a corresponding one of at least one sub-range of scale values within the second range of scale values. The problem that the small difference between the respective original widths of two or more strokes of a character may be amplified into the difference of one picture element of an output character, becomes more serious as the scale of the output character becomes lower. Therefore, in the case where the scale data are indicative of a scale of an output character within the second range of scale values smaller than the first range of scale values, the second transforming means, different from the first transforming means, transforms the original width data into the second transformed width data according to the second relationship different from the first relationship. The second relationship provides a second transformed value corresponding to the scale values within a corresponding one of the at least one sub-range of scale values within the second range of scale values, so that the dot-matrix data produced from the transformed outline data including the second transformed width data define the output character with higher quality than those produced from the transformed outline data including the first transformed width data. For example, the second relationship may provide, for each original width value, a second transformed value smaller than a first transformed width provided by the first relationship, according to any scale value within the second range of scale values. In this case, the output character enjoys a better visual balance between the two or more strokes of the character. The at least one sub-range of scale values within the second range of scale values may be pre-determined depending upon the frequency of use of each scale value.

According to a preferred feature of the present invention, the second transforming means comprises means for directly transforming, according to the scale data indicative of the scale of the output character within the second range of scale values, the at least one set of original width data into the at least one set of second transformed width data according to the second relationship.

According to another feature of the present invention, the second transforming means comprises: means for transforming, according to the scale data indicative of the scale of the output character within the second range of scale values, the at least one set of original width data into at least one set of provisional transformed width data indicative of a provisional transformed width of the reference stroke, according to the second relationship; and means for transforming, according to the scale data, the at least one set of provisional transformed width data into the at least one set of second transformed width data according to the first relationship.

According to yet another feature of the present invention, the second transforming means comprises: means for transforming, according to the scale data indicative of the scale of the output character within the second range of scale values, the at least one set of original width data into at least one set of provisional transformed width data indicative of a provisional transformed width of the reference stroke, according to the first relationship; and means for transforming, according to the scale data, the at least one set of provisional transformed width data into the at least one set of second transformed width data according to the second relationship. The provisional transformed width data for the present case are different in nature from those for the preceding case.

According to another feature of the present invention, the second transforming means comprises means for transforming, according to the scale data indicative of the scale of the output character within the second range of scale values, the at least one set of original width data indicative of the original width of the reference stroke within a predetermined range of original width values, into 10 the at least one set of second transformed width data, according to the second relationship between the at least one transformed width value and the second-range scale values wherein the each of the at least one transformed width value corresponds to the scale values within the corresponding one of the at least one sub-range of scale values within the second range of scale values and simultaneously corresponds to the original width values within a corresponding one of at least one sub-range of original width values within the predetermined range of original width values. The present apparatus may operate for producing dot-matrix data from a batch of font data for a family of characters. Since the respective original width values of a number of vertical, horizontal, and/or oblique strokes of the family of characters provide a non-uniform distribution having a plurality of peaks (and valleys), two or more sub-ranges of original width values may be pre-determined such that each of the sub-ranges is defined to cover a corresponding one of the peaks. In this case, the output characters enjoy a better visual balance between the number of strokes thereof.

According to another feature of the present invention, the second transforming means comprises: means for transforming, according to the scale data indicative of the scale of the output character within the second range of scale values, the at least one set of original width data indicative of the original width of the reference stroke 10 within a predetermined range of original width values, into at least one set of provisional transformed width data indicative of a provisional transformed width of the reference stroke, according to the first relationship; and means for transforming the at least one set of provisional transformed width data into the at least one set of second transformed width data according to the second relationship between the at least one transformed width value and the second-range scale values wherein the each of the at least one transformed width value corresponds to the scale values within the corresponding one of the at least one sub-range of scale values within the second range of scale values and simultaneously corresponds to provisional transformed width values within a corresponding one of at least one sub-range of provisional transformed width values within a predetermined range of provisional transformed width values.

According to another feature of the present invention, the dot-matrix data producing apparatus further comprises judging means for judging whether the scale data are indicative of the scale of the output character within the second range of scale values, so that when the judging means makes a negative judgment the dot-matrix data producing means produces the dot-matrix data from the transformed outline data including the first transformed width data provided by the first transforming means, and so that when the judging means makes a positive judgment the dot-matrix data producing means produces the dot-matrix data from the transformed outline data including the second transformed width data provided by the second transforming means.

According to another feature of the present invention, the second transforming means comprises: provisional transformation means for transforming, according to the scale data indicative of the scale of the output character within the second range of scale values, the original outline data including the at least one set of original width data, into provisional transformed outline data including at least one set of provisional transformed width data indicative of a provisional transformed width of the reference stroke, according to the first relationship; and correcting means for correcting, by utilizing each of the at least one set of second transformed width data in place of a corresponding one of the at least one set of provisional transformed width data, the provisional transformed outline data into the transformed outline data defining the at least one transformed outline of the output character.

According to another feature of the present invention, the second transforming means comprises: provisional transformation means for transforming, according to the scale data indicative of the scale of the output character within the second range of scale values, at least one set of original position data representing respective original positions of the two opposed segments defining the 10 reference stroke of the original character, and thereby providing at least three original intervals with respect to at least one of an X axis and a Y axis which is perpendicular to the X axis and cooperates with the X axis to provide a two-dimensional coordinate system in which the original outline data define the at least one original outline of the original character, into at least one set of provisional transformed position data defining at least three provisional transformed intervals with respect to the at least one of the X axis and the Y axis; correcting means for correcting, by utilizing the at least one set of second transformed width data, the at least one set of provisional transformed position data into at least one set of corrected position data defining at least three corrected intervals with respect to the at least one of the X axis and the Y axis; function determining means for determining, based on the original position data and the corrected position data, a transformation function for each of at least one of the original intervals; and coordinate transformation means for transforming the original outline data comprising a plurality of original sets of x and y coordinates which cooperate with each other to define the at least one original outline of the original character, into the transformed outline data comprising a plurality of transformed sets of x and y coordinates which cooperate with each other to define the at least one transformed outline of the output character, the coordinate transformation means transforming at least one of (a) an x coordinate and (b) a y coordinate of at least one the original set of x and y coordinates within the each of the at least one of the original intervals, into at least one of (a) an x coordinate and (b) a y coordinate of at least one the transformed set of x and y coordinates within a corresponding one of the corrected intervals, according to the transformation function determined for the each original interval. The original position data representing the respective original positions of the two opposed segments defining the reference stroke of the original character, may consist of (a) two original x or y coordinates for the two original positions of the two opposed segments or (b) one original x or y coordinate for one of the two original positions and a width value equal to the distance between the two original positions. In either case, the original position data may provide the original width data.

According to another feature of the present invention, the second transforming means comprises means for transforming the at least one original width data for at least one the reference stroke of the original character, the at least one reference stroke comprising at least one of (a) a vertical stroke defined by two opposed vertical straight segments of the at least one original outline of the original character, (b) a horizontal stroke defined by two opposed horizontal straight segments of the original outline, and (c) an oblique stroke defined by two opposed parallel oblique straight segments of the original outline.

According to another feature of the present invention, the dot-matrix data producing apparatus further comprises an output device which outputs the output character according to the dot-matrix data, the second transformed width defined by the second transformed width data corresponding to an integral number of picture elements of the output character produced by the output device.

According to another feature of the present invention, the dot-matrix data producing apparatus further comprises a parameter memory which stores the at least one of (a) the scale data and (b) the at least one character code, the scale data comprising size data indicative of a desired size of the output character.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 4(a) is a table for explaining the outline data of character "F" stored in a character-data ROM 13 of the control circuit of FIG. 1;

FIG. 4(b) is a table for explaining the line-spacing data of character "F" stored in the character-data ROM 13;

FIG. 5 is a table for explaining a corrected spacing data table stored in a corrected spacing data ROM 111 of the control circuit of FIG. 1;

FIG. 7 is a table corresponding to FIG. 5, for explaining a different corrected spacing data table stored in a corrected spacing data ROM 111 of the second embodiment of the invention;

FIG. 12(a) is a table for explaining the outline data of character "n" stored in a character-data ROM 13 of the fourth embodiment;

FIG. 12(b) is a table for explaining the line-spacing data of character "n" stored in the character-data ROM 13 of the fourth embodiment;

FIG. 13 is a data table for explaining the steps for determining a transformation function for transforming the outline data of character "n" of FIG. 10;

FIG. 14 is a transformation table in which transformation functions are set for the corresponding original intervals;

DETAILED DESCRIPTION OF THE PREFERRED EMBODIMENTS

Figure 1:
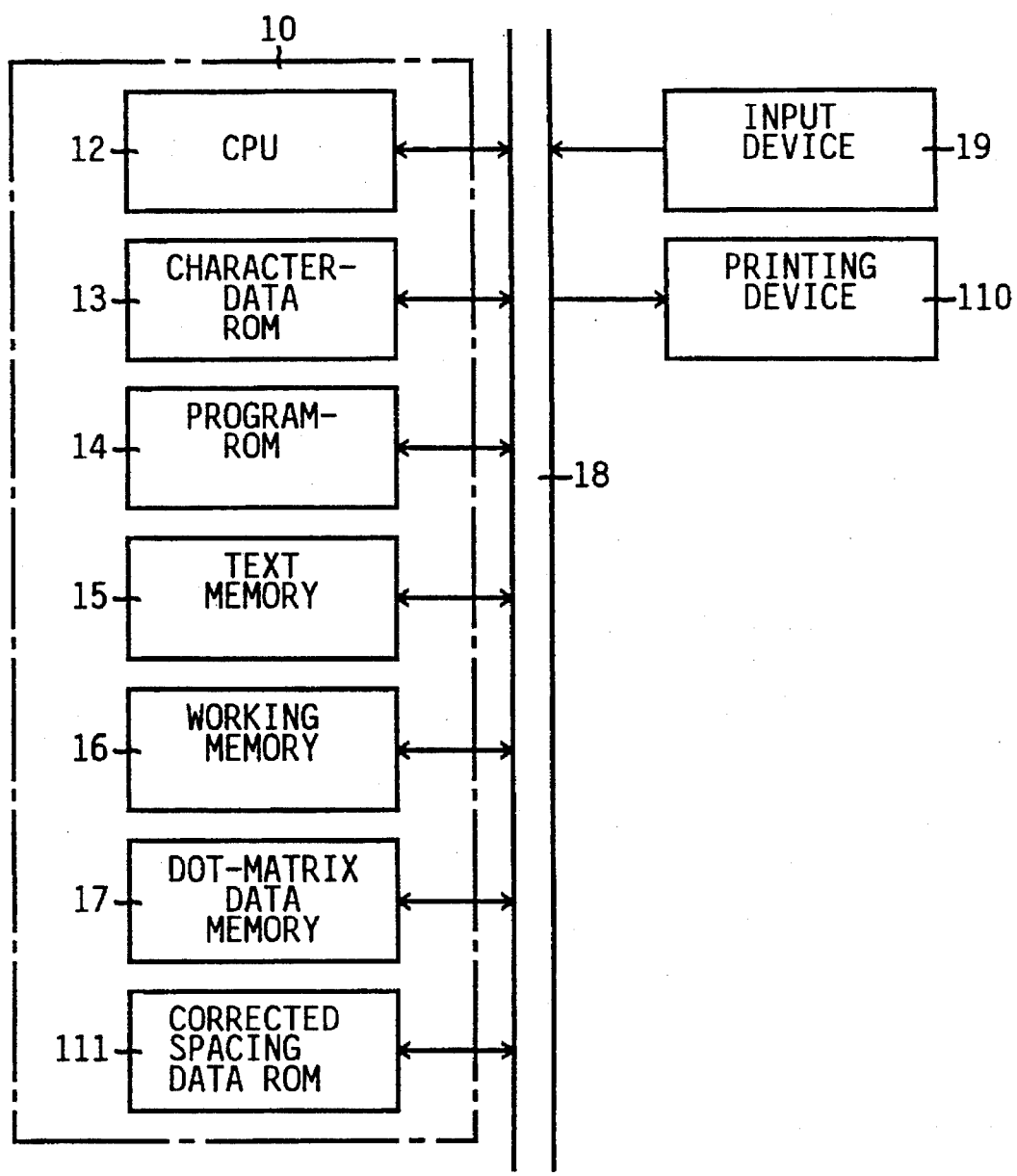
FIG. 1 is a diagrammatic view of a control circuit of a laser printer to which the present invention is applied.

Referring first to FIG. 1, there is shown a control circuit of a laser printer to which the present invention is applied. The control circuit processes character font data including a number of sets of character data for a number of characters such as a letter, numeral, figure, or symbol. More specifically, the control circuit converts each set of character data into dot-matrix data, so that the laser printer outputs a corresponding character according to the thus produced dot-matrix data. Each set of character data contain outline data defining one or more outlines of a corresponding character. The control circuit is essentially constituted by a microcomputer 10 including a central processing unit (CPU) 12, a character-data read only memory (ROM) 13, a program ROM 14, a text memory 15, a working memory 16, a dot-matrix data memory 17, and a corrected spacing data ROM 111. The elements 12 to 17 and 111 are connected to each other via bus 18. The laser printer further includes an input device 19 and a printing device 110 each of which is connected to the microcomputer 10. The CPU 12 operates for producing dot-matrix data according to the control programs pre-stored in the program ROM 14.

The character-data ROM 13 stores a number of sets of character data as a batch of character font data. Each set of character data contain, in addition to outline data defining the outline of a corresponding character, line-spacing data for use in adjusting the width of a vertical or horizontal stroke of the character defined by two opposed segments of the outline of the character. The character data are obtainable from the character-data ROM 13 when an operator inputs a corresponding character code through the input device 19.

Figure 2:
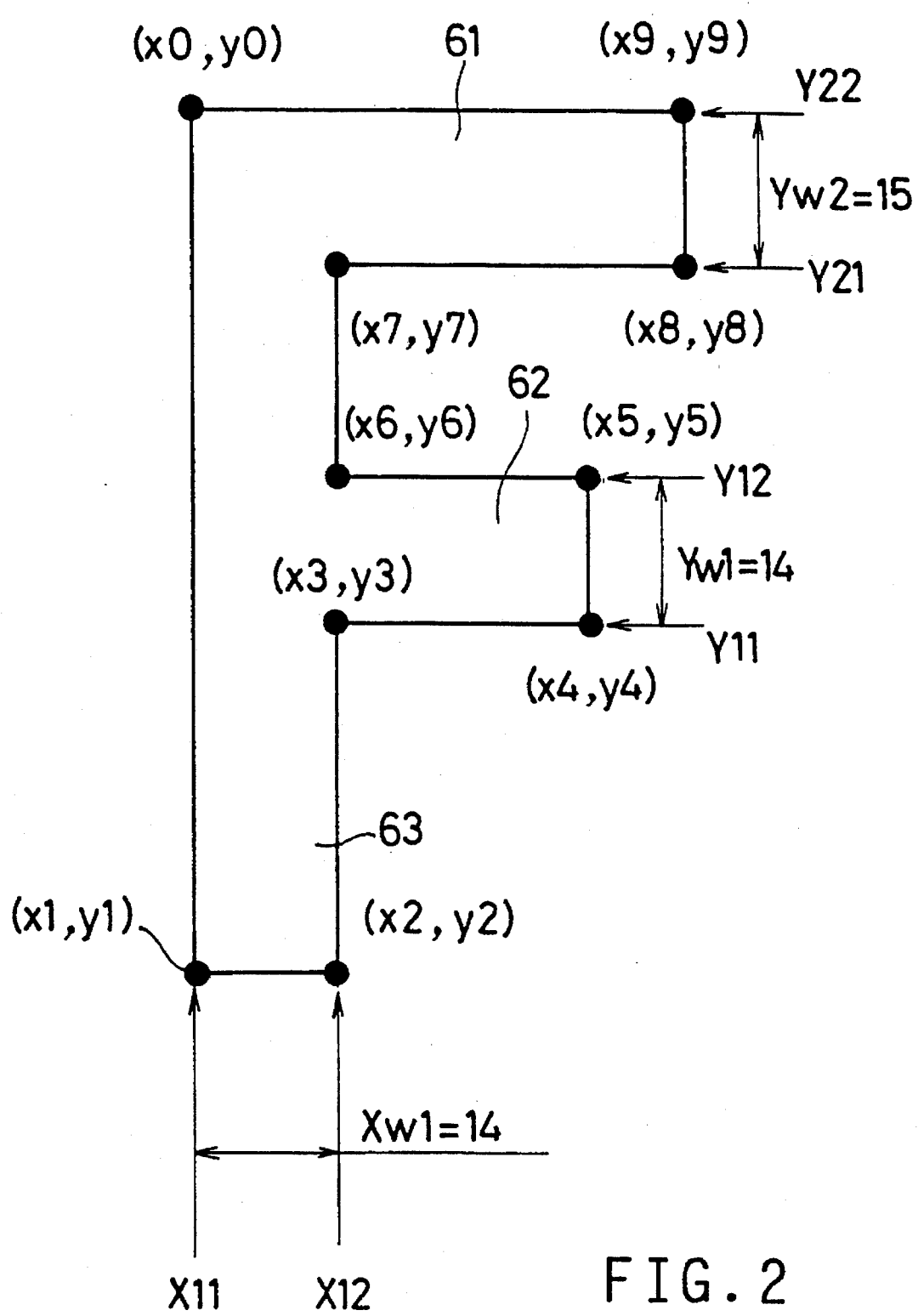
FIG. 2 is a view for explaining outline data defining the outline of a character, "F"

Outline data represent a character by defining one or more outlines of the character in a two-dimensional orthogonal coordinate system provided by an X and a Y axis perpendicular to each other. Usually, outline data include both straight-line data defining a straight line or lines and curved-line data defining a curved line or lines (e.g., cubic Bezier curves). However, the following description refers to an example of outline data including only straight-line data, for easier understanding of the present embodiment. FIG. 2 shows outline data defining the outline of a character, "F", as an example. As shown in FIG. 4(a), the outline data include a plurality of ordered sets of point data, i.e., ordered sets of x and y coordinates for a plurality of defining points which cooperate with each other to define the character outline. The outline data further include set-number data indicating the number of the ordered sets of point data. The character outline is defined by connecting the ordered points with straight lines.

The line-spacing data of character data comprise two sorts of data, i.e., x line-spacing data for one or more vertical strokes, and y line-spacing data for one or more horizontal strokes, of a character. Each set of x or y line-spacing data contains point data and spacing data. The point data include two x or y coordinates representing the respective positions of the two opposed outline segments defining a vertical or horizontal stroke of a character the width of which stroke is to be adjusted, and the spacing data define the distance between the two x or y coordinates, i.e., width of the vertical or horizontal stroke of the character defined by the two opposed outline segments. Thus, in the present embodiment, character data may contain (a) one or more sets of x line-spacing data for one or more vertical strokes of a character, (b) x set-number data indicating the number of the set or sets of x line-spacing data, and (c) one or more sets of y line-spacing data for one or more horizontal strokes of the character, and (d) y set-number data indicating the number of the set or sets of y line-spacing data. In association with the outline data shown in FIG. 4(a), the character data of character "F" include the line-spacing data shown in FIG. 4(b). More specifically, the line-spacing data include one set of x line-spacing data for a vertical stroke 63 of the character (FIG. 2) and two sets of y line-spacing data for two horizontal strokes 61, 62 of the same.

In the present embodiment, original outline data define the outline of a character in 100×100 square unit areas. Each square unit area is defined by adjacent two x integral coordinates and adjacent two y integral coordinates. In the present embodiment, it is assumed that each square unit area correspond to one picture element of an output character to be produced by the printing device 110. Thus, the spacing data of a set of x or y line-spacing data define the original width of a vertical or horizontal stroke of a character in terms of square unit areas.

The program ROM 54 stores the control programs for use in processing the character data of a desired character into dot-matrix data according to which the character is printed by the printing device 110. The input device 19 (e.g., keyboard) is manually operable by an operator or user for inputting a character code corresponding to a desired character, and size data indicative of a desired size of the output character. The text memory 15 (e.g., random access memory, RAM) stores the character codes and size data input through the input device 19. The working memory 16 (e.g., RAM) temporarily stores various sorts of data necessary for the CPU 12 to operate according to the control programs pre-stored in the program ROM 14. The dot-matrix data memory 17 stores dot-matrix data produced by processing character data or outline data. The printing device 110 prints or records, by electrophotography, the character on a recording medium according to the dot-matrix data stored in the dot-matrix data memory 17.

The corrected spacing data ROM 111 stores a corrected spacing data table representing the relationship between (A) (a1) output sizes and (a2) original spacing data and (B) corrected spacing data. The original spacing data are the spacing data obtained from the character-data ROM 13, i.e., before being size-changed according to the size data stored in the text memory 15. FIG. 5 shows the corrected spacing data table pre-stored in the corrected spacing data ROM 111. In the present embodiment, a desired "point" number (one "point" is 1/72 inch) is input as the size data by the operator through the input device 19. The point numbers of 0 through 26 are divided into three ranges. Each of the three point-number ranges is associated with one or more pre-determined ranges of original spacing data.

Hereinafter, there will be described the operation of the control circuit or microcomputer 10 for producing dot-matrix data from character data, i.e., outline data and line-spacing data, by reference to the flow chart of FIG. 6.

Initially, at Step S1, the CPU 12 reads in, from the character-data ROM 13, the outline data and line spacing data for a character corresponding to a character code input by the operator through the input device 19 and stored in the text memory 15. The CPU 52 also reads in, from the text memory 15, the size data (i.e., point number p) specified for the character by the user through the input device 19.

Subsequently, at Step S2, the CPU 12 transforms the x and y coordinates of the outline data and the line-spacing data, by multiplying or dividing the respective coordinates by a transformation coefficient corresponding to the size data or point number p. The thus obtained outline data are provisional transformed outline data representing a provisional transformed outline of the character. The spacing data of the provisional transformed line-spacing data represent the provisional transformed width of a vertical or horizontal stroke of the character, and are stored as the provisional transformed spacing data in the working memory 16. The spacing data before the data transformation, i.e., original spacing data are stored in association with the corresponding provisional transformed spacing data, for being used at the following step S3, i.e., spacing data correction operation. For example, the line-spacing data, (Y11, Y12, Yw1), shown in FIG. 4(b) for the horizontal stroke 61 of character "F" of FIG. 2 are transformed and stored as the provisional transformed line-spacing data, (Y11a, Y12a, Yw1a). The y coordinates Y11a, Y12a are the provisional transformed values of the original y coordinates Y11, Y12, respectively. The width value Yw1a is the provisional transformed value of the original width value Yw1.

At Step S3, the CPU 12 operates for correcting the spacing data of the original line-spacing data. Specifically, the CPU 12 obtains, from the corrected spacing data table of FIG. 5 stored in the corrected spacing data ROM 111, a corrected width value corresponding to both the desired output size and the original spacing data. If the CPU 12 finds the corresponding corrected width value in the corrected spacing data table of FIG. 5, the CPU 12 adopts the thus found corrected width value in place of the corresponding provisional transformed spacing data as proper transformed spacing data. If not, the CPU 12 keeps the provisional transformed spacing data. This operation is effected for each set of x or y line-spacing data.

For example, in the case where the character "F" of FIG. 2 is output at a desired size of 10 points (i.e., point number p=10), the original spacing data, Yw1=15, of the horizontal stroke 61 is replaced by a corresponding corrected width value, 1, found in the corrected spacing data table of FIG. 5. Thus, the provisional transformed line-spacing data (Y11a, Y12a, Yw1a) are changed to proper transformed line-spacing data, (Y11a, Y12a, 1). Similarly, the original spacing data, Yw2=14, of the horizontal stroke 62 and the original spacing data, Xw1=14, of the vertical stroke 63 each are replaced by a corresponding corrected width value, 1, found in the table of FIG. 5. Thus, the two sets of provisional transformed line-spacing data, (Y21a, Y22a, Yw2a) and (X11a, X12a, Xw1a), are changed to the two sets of proper transformed line-spacing data, (Y21a, Y22a, 1) and (X11a, X12a, 1), respectively. Meanwhile, in the case where the character "F" is output at the original size of 100 points (i.e., p=100), no corrected width value has not been prepared for the size of 100 points and the CPU 12 cannot find any corresponding corrected width value in the table of FIG. 5. Therefore, the CPU 12 keeps the provisional transformed spacing data as the proper transformed spacing data. For the character "F", the three sets of provisional transformed line-spacing data (Y11a, Y12a, Yw1a), (Y21a, Y22a, Yw2a) and (X11a, X12a, Xw1a) each are used as the proper transformed line-spacing data.

Step S3 is followed by Step S4 to correct the provisional transformed outline data by using the proper transformed line-spacing data which may or may not include the corrected spacing data. This operation has been described in detail in the related art statement. It is noted that the corrected spacing data obtained at Step 3 correspond to the dot width explained in the related art statement. Step S4 is followed by Step S5 to produce dot-matrix data from the thus corrected (i.e., proper transformed) outline data according to a predetermined rule, and store the dot-matrix data in the dot-matrix data memory 17. The dot-matrix data include one or more sets of inside data (e.g., "ON" data) substantially defining the inside area of the corrected (i.e., proper transformed) outline of the character and one or more sets of outside data ("OFF" data) substantially defining the outside area of the corrected outline of the character. In the present embodiment, it is assumed that each picture element of an output character correspond to a square unit area defined by two adjacent x integral coordinates and two adjacent y integral coordinates, as described previously. The above predetermined rule may be such that if the center of each square unit area falls within the inside area of the corrected outline of a character, that picture element is defined by a set of inside data and if not that picture element is defined by a set of outside data. The inside and outside areas of an output character may reversely be defined by the "OFF" data and the "ON" data, respectively.

Figure 3:
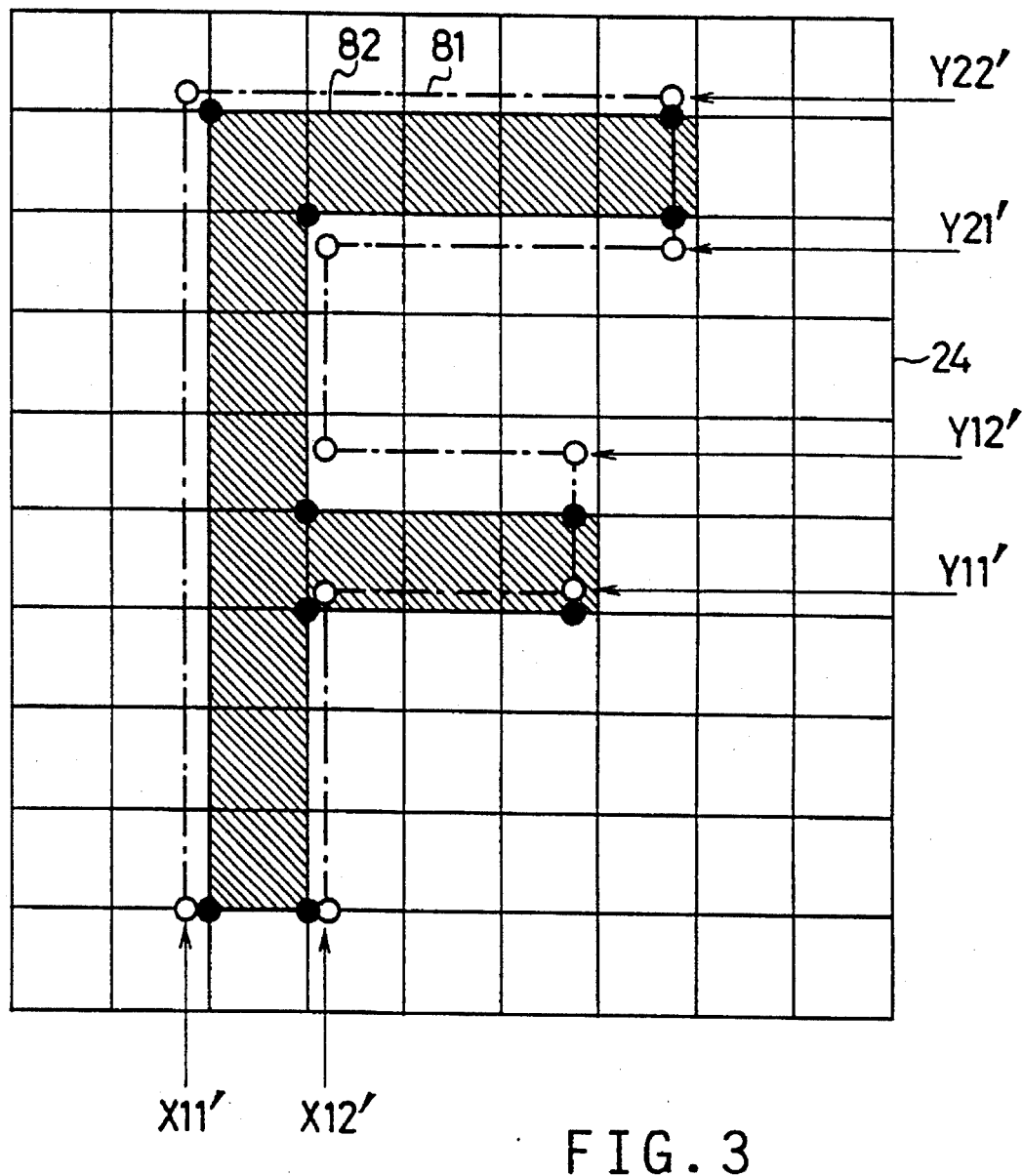
FIG. 3 is a view for explaining the dot-matrix data of character "F" produced from the outline data of FIG. 2 by the control circuit of FIG. 1.

FIG. 3 shows the dot-matrix data produced from the corrected outline data of character "F" by the raster-scanning method using the picture-element screen 24. The dot-matrix data define the character "F" at the size of 10 points. An outline 81 is defined by the provisional transformed outline data obtained at Step S2, and an outline 82 is defined by the corrected (i.e., proper transformed) outline data obtained at Step S4 based on the proper transformed line-spacing data which may or may not include the corrected spacing data. The "ON" data of the dot-matrix data produced at Step S5 define the shadowed square unit areas indicated by hatching in FIG. 3. The horizontal stroke 61 of character "F" has the width of 1 (i.e., one-dot width) corresponding to one set of "ON" data, like the horizontal stroke 62, and gives a better impression to observers. Meanwhile, in the case where the original outline data are used for outputting the character "F" at the original size of 100 points, the two horizontal strokes 61, 62 are output with the width difference of 1 (i.e., one-dot difference) corresponding to one set of "ON" data, thereby enjoying an excellent visual balance therebetween.

Figure 8:
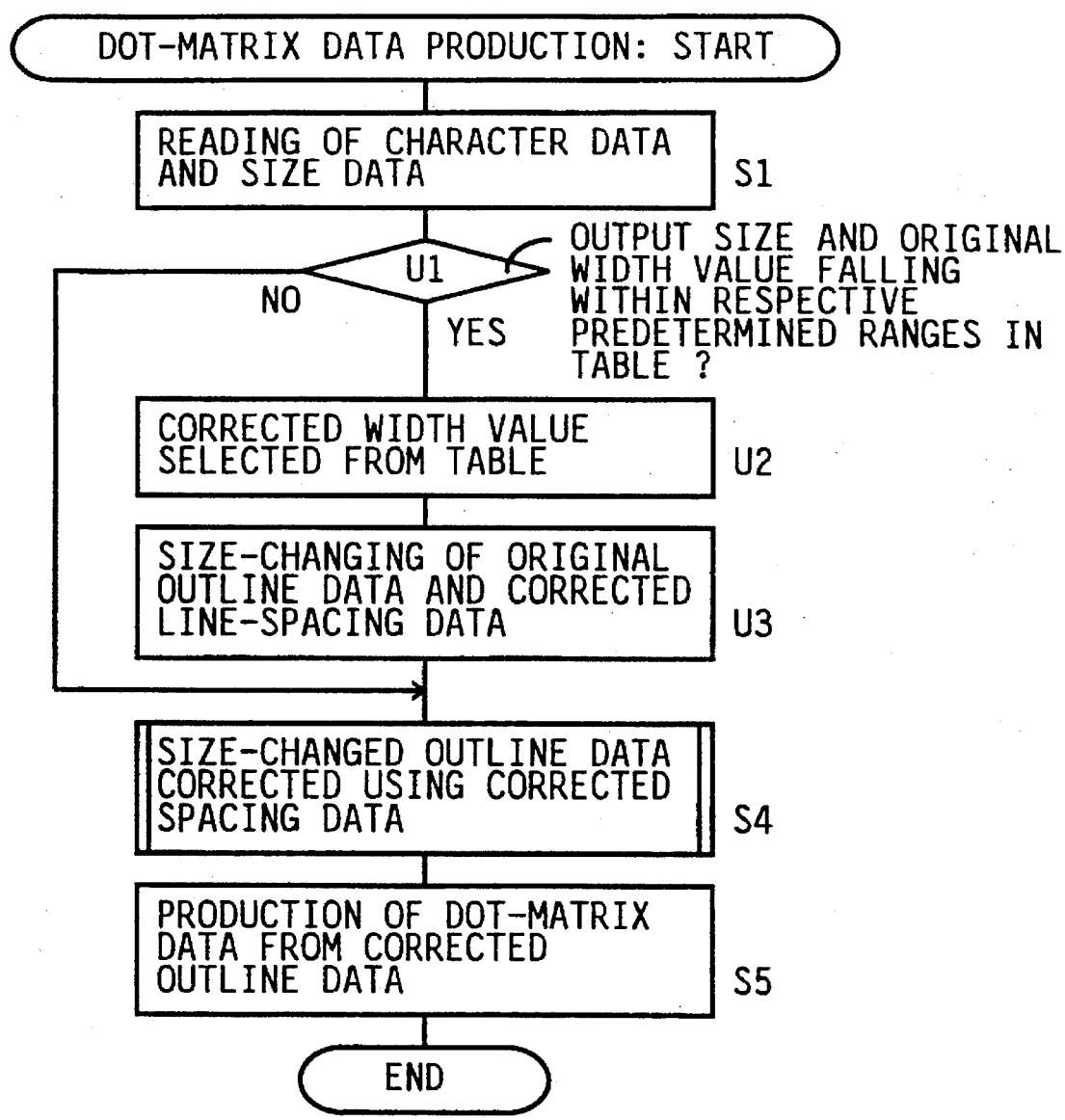
FIG. 8 is a flow chart corresponding to FIG. 6, for representing a dot-matrix data production program stored in a program ROM 14 of the second embodiment.

Referring next to FIGS. 7 and 8, there will be described the second embodiment of the present invention. The second embodiment relates to the control circuit of a laser printer, and has the same hardware construction as that of the first embodiment shown in FIG. 1. In the second embodiment, however, a corrected spacing data ROM 111 stores a corrected spacing data table of FIG. 7 in place of the table of FIG. 5, and a CPU 12 operates according to a flow chart of FIG. 8 in place of the flow chart of FIG. 6.

Figure 6:
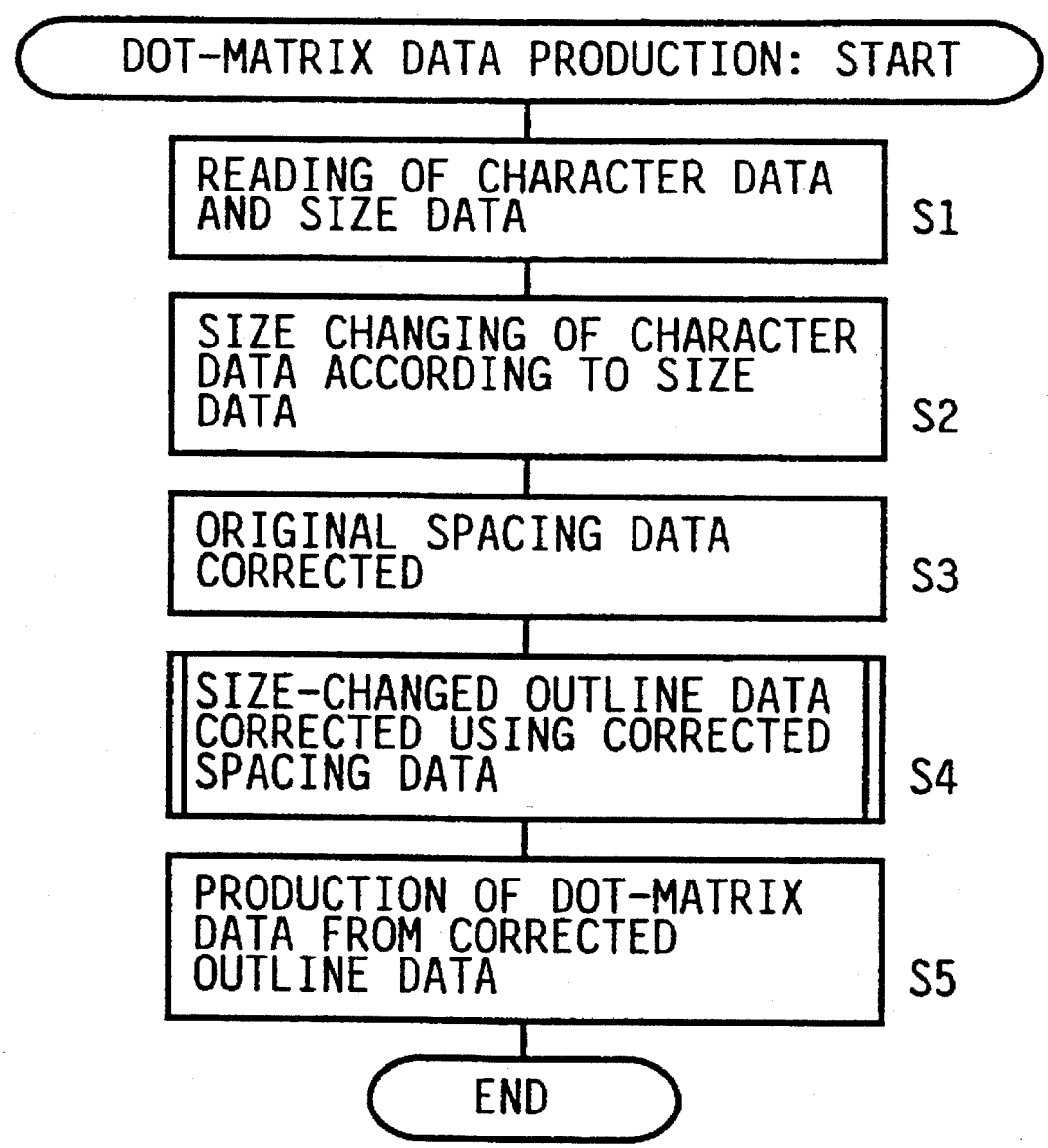
FIG. 6 is a flow chart representing a dot-matrix data production program stored in a program ROM 14 of the control circuit of FIG. 1.

Steps S1, S4 and S5 of FIG. 8 are the same as those of FIG. 6, and the description of those steps are omitted. At Step U1, the CPU 12 judges whether the size data input through an input device 19 and stored in a text memory 15 are indicative of an output size within a predetermined range of 0 through 26 points grouped into three sub-ranges. If a positive judgment is made, the CPU 12 further judges whether the original spacing data of the current x or y line-spacing data are indicative of an original width value within a single original-width range, or one of two or more original-width sub-ranges, predetermined for each of the three size sub-ranges. If the CPU 12 again makes a positive judgment, the control of the CPU 12 goes to Step U2 to find, in the table of FIG. 7, a corrected width value corresponding to the output size and the original width value, and correct the original line-spacing data by replacing the original spacing data by the thus obtained corrected spacing data indicative of the found corrected width value. Step U2 is followed by Step U3 to size-change the original outline data and the thus corrected line-spacing data including the corrected spacing data.

If the thus size-changed spacing data are indicative of a size-changed width value smaller than one, the width value is counted as one. In the second embodiment, too, an output character enjoys a good visual effect on stroke widths even if the character is output at a small size.

Figure 9:
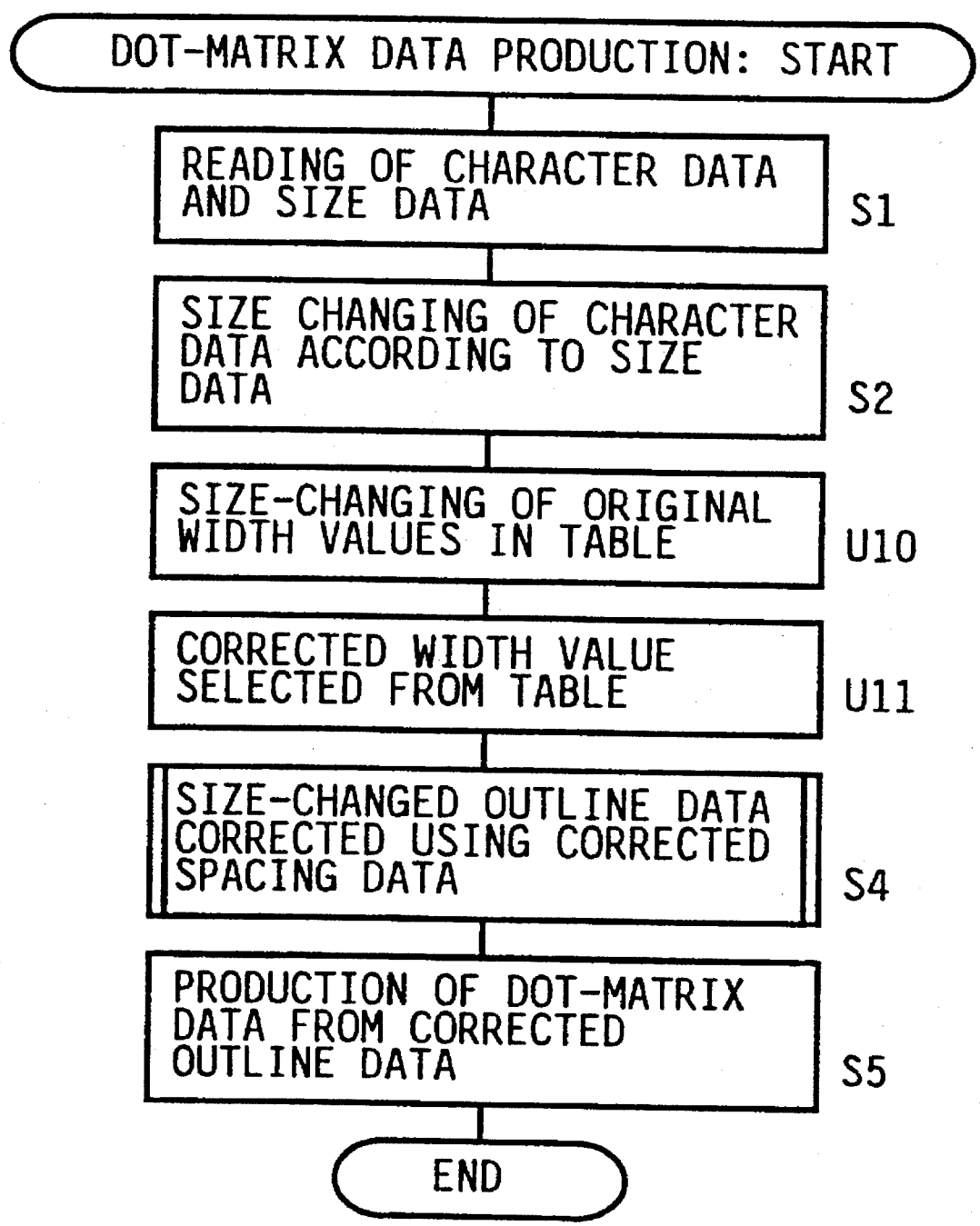
FIG. 9 is a flow chart corresponding to FIG. 6, for representing a dot-matrix data production program stored in a program ROM 14 of the third embodiment.

Referring next to FIG. 9, there will be described the third embodiment of the present invention. The third embodiment relates to the control circuit of a laser printer, and has the same hardware construction as those of the first and second embodiments shown in FIG. 1. In the third embodiment, a corrected spacing data ROM 111 stores the same corrected spacing data table as the table of FIG. 5 for the first embodiment, and a CPU 12 operates according to a flow chart of FIG. 9 in place of the flow chart of FIG. 6.

The flow chart of FIG. 9 includes, in place of Step S3 of FIG. 6, Steps U10 and U11. At Step U10, the CPU 12 size-changes, according to size data indicative of an output size of a character, a single range of original width values, or each of two or more sub-ranges of original width values, for one of the three size sub-ranges within which one sub-range the output size falls. Step U10 is followed by Step U11 where the CPU 12 selects the range or sub-range of size-changed width values within which the size-changed width value defined by the size-changed spacing data obtained at Step S2 falls, and finds a corrected width value corresponding to the selected range or sub-range. In the third embodiment, too, an output character enjoys a good visual effect on stroke widths even if the character is output at a small size.

Referring next to FIGS. 10 through FIG. 15, there will be described the fourth embodiment of the present invention. The fourth embodiment relates to the control circuit of a laser printer, and has the same hardware construction as those of the first to third embodiments shown in FIG. 1. In the fourth embodiment, a character data ROM 13 stores the outline data of a character "n" shown in FIG. 10. As shown in FIG. 12(a), the outline data include a plurality of ordered sets of point data each set of which defines the position, i.e., has the x and y coordinates, of a corresponding one of a plurality of defining points which cooperate with each other to define the outline of the character. The outline data further include, in association with each set of point data by way of a corresponding index number, (a) point-sort data indicating whether that point data define the terminating end point of a straight line ("L") as a portion of an outline, a control point of a curved line (e.g., cubic Bezier curve) ("A") as a portion of an outline, or the terminating end point of a curved line ("B"), and (b) end-point data indicating whether that point data define the terminating point of an outline ("1") or not ("0"). The outline data additionally include point-number data indicating the total number of the sets of point data, and outline-number data indicating the total number of the outline or outlines of the character. Thus, as shown in FIG. 12(a), the ordered sets of point data provide an ordered array of x coordinates (hereinafter, referred to as the "x-coordinate array"), an ordered array of y coordinates ("y-coordinate array"), an ordered array of point-sort data, and an ordered array of end-point data. A set of point data defining the terminating end point of a straight or curved line also defines the starting end point of a straight or curved line following that preceding line. A set of point data defining the terminating point of an outline also defines the starting point of the same outline.

As shown in FIG. 12(b), outline data are associated with (a) x line-spacing data including the respective x coordinates of two opposed outline segments of a vertical stroke of the character which extend parallel to the Y axis; and (b) y line-spacing data including the respective y coordinates of two opposed outline segments of a horizontal stroke of the character which extend parallel to the X axis. Each of (a) the x line-spacing data and (b) the y line-spacing data may be none, or may be in plural sets, for a particular character. Therefore, the x or y line-spacing data are associated with set-number data indicating the total number of the set or sets of data for each information (a) and (b). The original x or y line-spacing data define at least three original intervals with respect to the X or Y axe of the x-y coordinate system in which the original outline of the character is defined by the original outline data.

Figure 10:
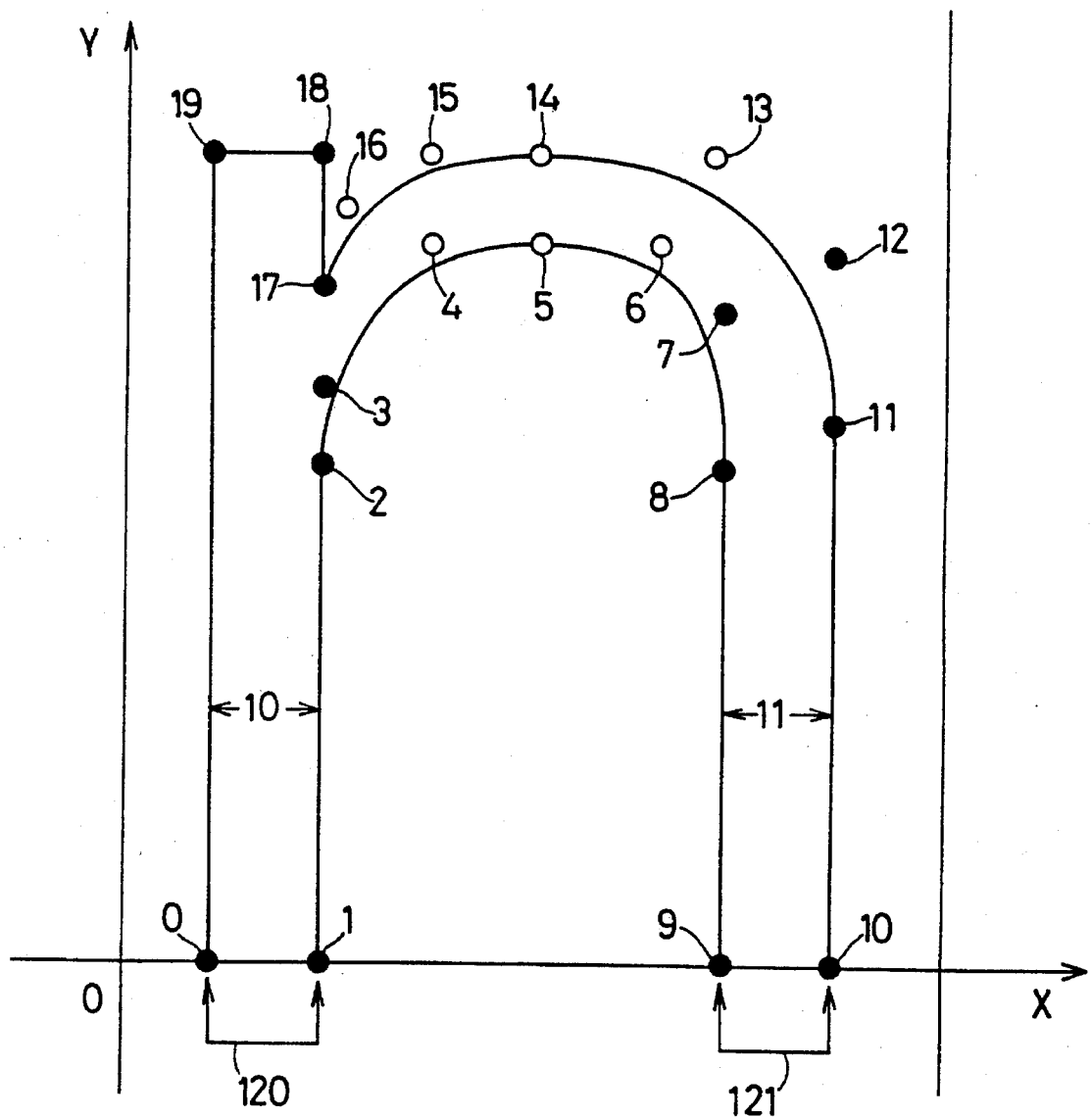
FIG. 10 is a view for explaining outline data defining the outline of a character, "n"

As shown in FIG. 10, the outline of character "n" is defined by twenty defining points assigned with respective numbers, 0 to 19, which numbers are utilized as index numbers for association with the corresponding sets of point data shown in FIG. 12(a). A defining point with an index number, i, (i=0, 1, 2, ... ) in FIG. 10 has an x coordinate, xi, and a y coordinate, yi, in the table of FIG. 12(a). Meanwhile, the x line-spacing data include, as indicated at "wxl0", "wxh0", "wxl1", and "wxh1" in FIG. 12(b), a pair of smaller and greater x coordinates for a first x line spacing or stroke 120 in FIG. 10 and another pair of smaller and greater x coordinates for a second x line spacing or stroke 121. The outline data for the character "n" are not associated with any set of y line-spacing data.

Figure 15:
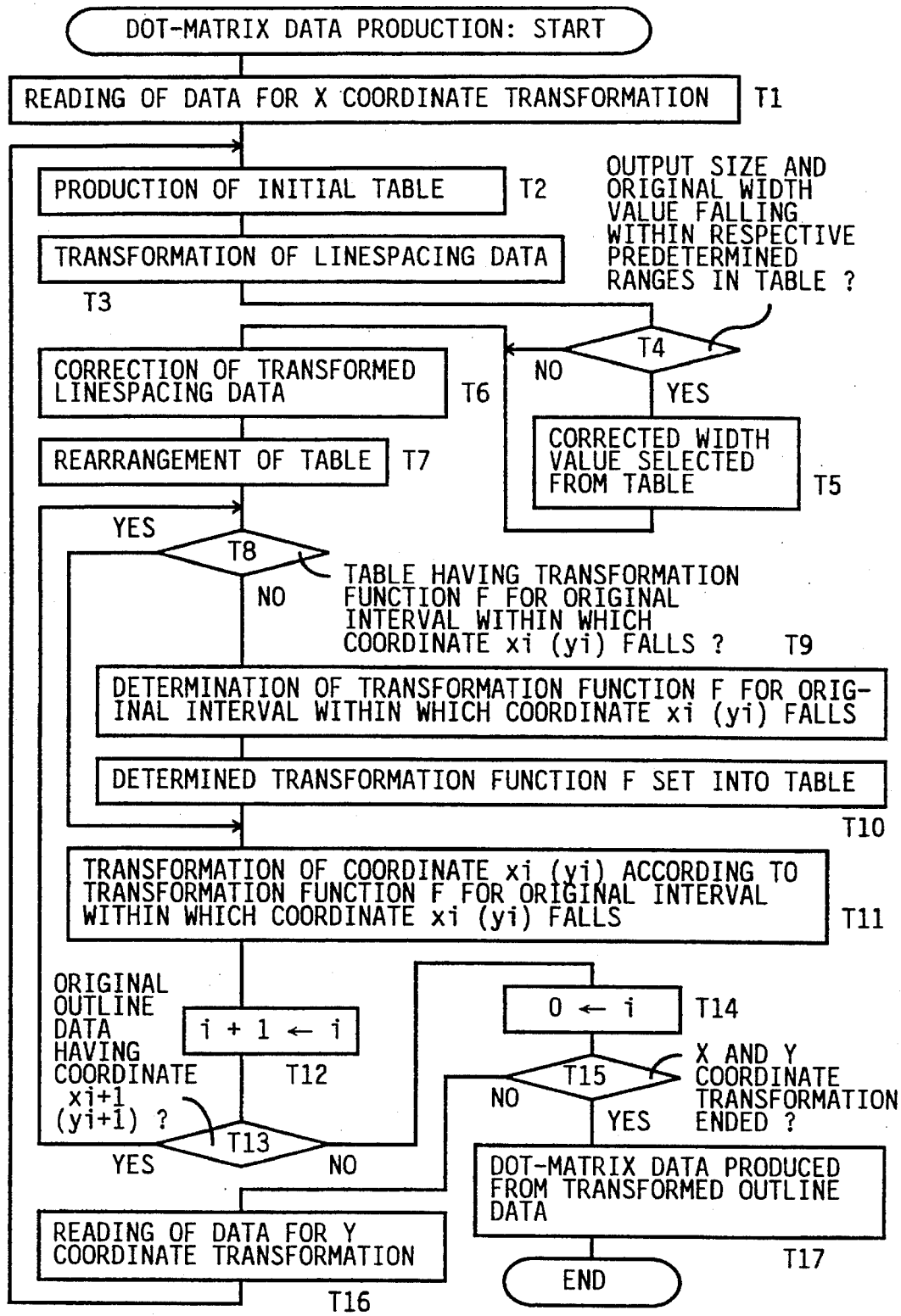
FIG. 15 is a flow chart representing a dot-matrix data production program stored in a program ROM 14 of the fourth embodiment.

Hereinafter, there will be described the operation of the control circuit for producing dot-matrix data from character data, i.e., outline data and line-spacing data, by reference to the flow chart of FIG. 15. This dot-matrix data production includes coordinate transformation using a transformation table shown in FIGS. 13 and 14.

First, the x coordinates of the outline data of character "n" are transformed, and subsequently the y coordinates of the same are transformed. Initially, at Step T1 of FIG. 15, the CPU 12 reads in, as coordinate-array data, the respective x coordinates of the x-coordinate array of the original outline data, and additionally reads in the point-number data indicating the total number of those x coordinates. The CPU 52 also reads in, as line-spacing data, the x line-spacing data. The CPU 52 further reads in the size data (i.e., point number p) and translation data (i.e., parallel-translation amount) as transformation data with respect to the X axis, from the text memory 15. In the present embodiment, the original x or y line-spacing data provide original width data for use in adjusting the number of square unit areas (i.e., picture elements) to be located between two opposed outline segments defining a stroke of an output character.

Next, at Step T2, the CPU 52 sets the respective x coordinates of the x line-spacing data into a data table shown in FIG. 13. In the data table, LINE SPACING DATA 0 corresponds to the first x line-spacing data, i.e., first pair of x coordinates, wxl0 and wxh0; and LINE SPACING DATA 1 corresponds to the second x line-spacing data, i.e., second pair of x coordinates, wxl1 and wxh1. The x coordinates wxl0, ... are original x coordinates of the outline data for the character "n".

Subsequently, at Step T3, the CPU 12 transforms the respective original x coordinates set in the data table of FIG. 13, into provisional transformed line-spacing data, i.e., respective target coordinates, Twxl0, ..., according to the transformation data obtained at Step T1. The transformation data specifies the transformation coefficient, Z, and parallel-translation amount, T, of an arbitrary x (or y) coordinate with respect to the X (or Y) axis. The transformation coefficient Z is calculated in the previously-described manner after a desired output size (i.e., point number p; p=1 is equal to 1/72 inch) is selected by the operator through the input device 19. The parallel-translation amount T is also input by the operator through the input device 19. Each of the original x coordinates, v, set in the data table of FIG. 13 is transformed into a target coordinate, v', according to the following expression:

$$v' = Z \times v + T.$$

Step T3 is followed by Step T4 to calculate an original width of each of the two strokes 120, 121 of character "n" based on the a corresponding x line-spacing data, i.e., pair of x coordinates (wxl0, wxh0) or (wxl1, wxh1), and judge whether a corrected spacing data table of FIG. 5 stored in a corrected spacing data ROM 111 provides a corrected with value corresponding to the desired output size p and the calculated original width of each stroke 120, 121. If a negative judgment is made, the control of the CPU 12 skips Step T5 and directly proceeds with Step T6. On the other hand, if a positive judgment is made, the control goes to Step T5 to select the corrected with value corresponding to the desired output size p and the calculated original width of each stroke 120, 121.

At the following Step T6, the CPU 12 corrects the provisional transformed line-spacing data, i.e., respective target coordinates Twxl0, ... into corrected line-spacing data, i.e., respective corrected coordinates, HTwxl0, ..., according to a predetermined rule. For example, first, the CPU 12 selects one of the two target coordinates defining each stroke width, such that the selected one target coordinate has a smaller distance up to a boundary line of any picture element than that of the other target coordinate, and regards the selected one target coordinate as a base coordinate and the other target coordinate as a dependent coordinate. Additionally, the CPU 12 determines a "spacing" vector by multiplying the coefficient Z and a vector starting at the original coordinate corresponding to the base coordinate and ending at the original coordinate corresponding to the dependent coordinate, and rounding the length of the "spacing" vector by counting fractions of ½ and over as one and disregarding the rest. The CPU 12 determines a first corrected coordinate by moving the base coordinate to the boundary of picture element nearest thereto, i.e., rounding the base coordinate in the same manner as described above. Subsequently, the CPU 12 determines a second corrected coordinate by adding the rounded length of the "spacing" vector to the first corrected coordinate. Regarding the example of FIG. 10, this operation is effected two times for the two sets of x line-spacing data, LINE SPACING DATA 0 and LINE SPACING DATA 1, respectively.

Figure 11:
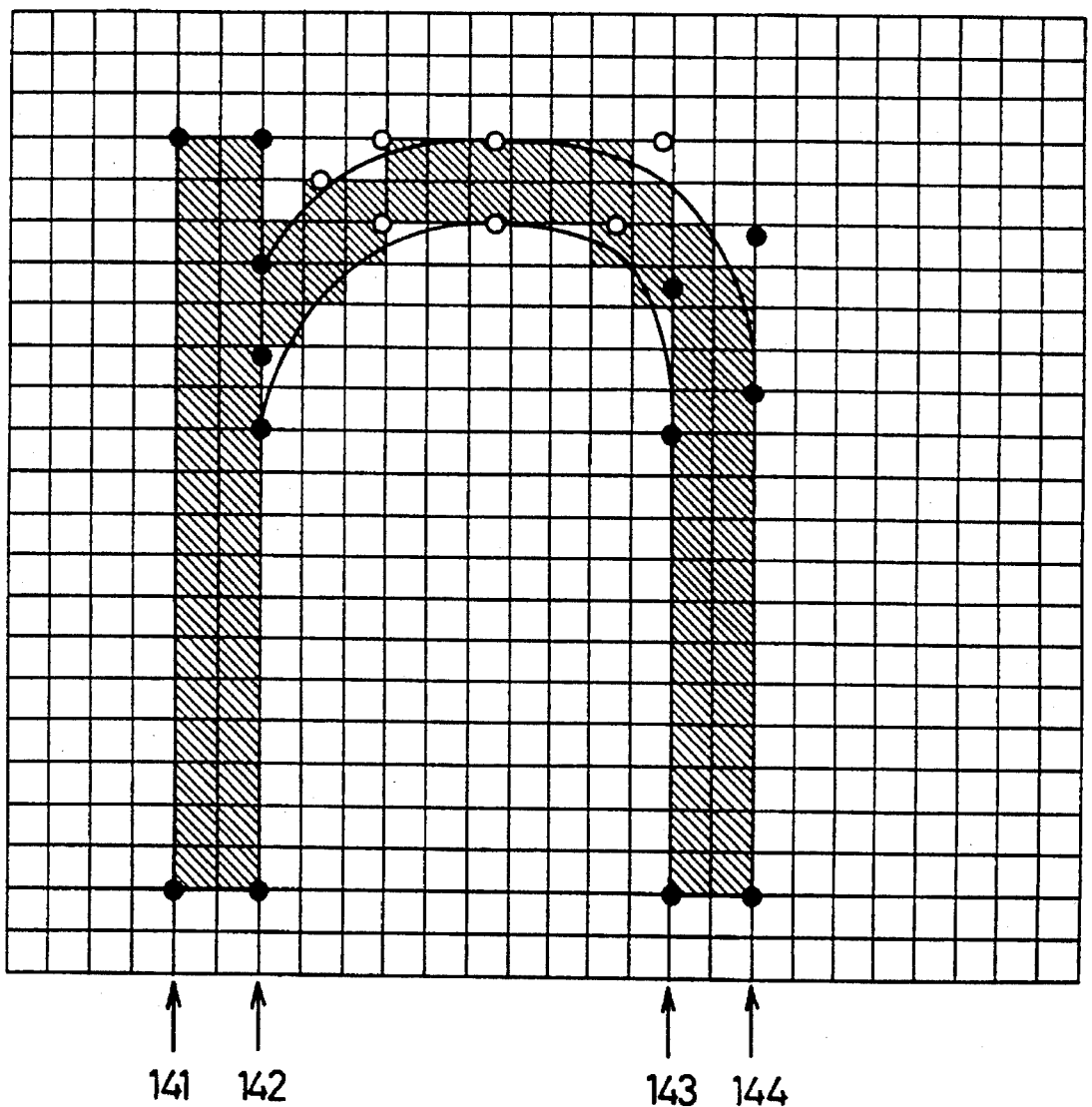
FIG. 11 is a view for explaining the dot-matrix data of character "n" produced from the outline data of FIG. 10 by a control circuit of the fourth embodiment.

In the graph of FIG. 11, the corrected coordinates HTwxl0, HTwxh0, HTwxl1, and HTwxh1 are indicated at 141, 142, 143, and 144, respectively.

Subsequently, at Step T7, the CPU 12 rearranges the data table of FIG. 13 into a new data table in which the corrected coordinates are re-arranged in the order of magnitude, and adds one data space following the bottom or last data space.

Step T7 is followed by Step T8 to judge whether a transformation function, F, for a particular original interval within which a current original coordinate xi (or yi; i=0, 1, 2, ...) falls, is set in the data table of FIG. 13 obtained at Step T7. If a positive judgment is made at Step T8, the control of the CPU 12 skips Steps T9 and T10 and directly goes to Step T11 (described later). On the other hand, if a negative judgment is made, the control goes to Step T9 to determine the transformation function F (i.e., constants a, b of a linear function, v'=a×v+b) for the original interval within which the original coordinate xi (or yi) falls, in the following manner: First, the CPU 12 divides the X (or Y) axis by the respective original coordinates of the original x (or y) line spacing, obtains at least three original intervals on the X (or Y) axis, and determines a transformation-function equation for each of the thus obtained original intervals. A linear function is determined as each transformation function. Supposing that each linear function be expressed as v'=a×v+b, the CPU 12 determines constants ai, bi (i=0, 1, 2, ...) of the linear function. In the data table of FIG. 14, constants ai, bi define a linear function for an original interval which is not smaller than an original coordinate with a number i−1 and smaller than an original coordinate with a number i. For example, constants a0, b0 define a linear function for an interval smaller than an original coordinate numbered 0, and constants a4, b4 define a linear function for an interval not smaller than an original coordinate numbered 4.

Regarding the transformation functions for the respective original intervals each of which is defined by, and between, two original coordinates, that is, linear functions numbered 1 to 3 in the data table of FIG. 14, the two constants a, b of each linear function are obtained by (a) replacing the values v, v' of the linear function: v'= a×v+b, with one, p, of the two original coordinates and the corresponding corrected coordinate, p', respectively; (b) subsequently replacing the values v, v' with the other original coordinate, q, and the corresponding corrected coordinate, q', respectively; and (c) then solving the thus obtained simultaneous equations with two unknowns a, b. The thus solved two constants a, b are as follows:

$$a = (q' - p')/(q - p)$$

$$b = (p' \times q - q' \times p)/(q - p)$$

Meanwhile, regarding the transformation functions for the respective intervals each of which is defined by only a single original coordinate, that is, linear functions numbered 0 and 4 in the data table of FIG. 14, the coefficient Z is used as the constant a of each linear function (i.e., a=Z), and the constant b is obtained by replacing the values v, v' of the linear function: v'=a×v+b, with the single original coordinate, p, and the corresponding corrected coordinate, p', respectively. The thus obtained two constants a, b are as follows:

$$a = Z$$

$$b = p' - p \times Z$$

On the other hand, in the case where the character data include no line spacing data with respect to the X (or Y) axis, that is, where no original intervals are defined with respect to the X (or Y) axis, there is no possibility that the dot-matrix data produced from the outline data suffer from quantization errors. In this case, therefore, the CPU 12 determines the scale factor Z and the parallel-translation amount T as the constants a, b of the linear function: v'=a×v+b, respectively; therefore, $$a = Z$$

$$b = T$$

Subsequently, at Step T10, the CPU 12 operates for setting the thus determined function F, i.e., constants a, b in an appropriate data space in the data table of FIG. 14. Steps T3 through T6 may be effected just before Step T9.

Step T10 is followed by Step T11 to transform the current original coordinate xi (yi) according to the transformation function F for the original interval to which the current original coordinate xi (yi) belongs. Subsequently, at Step T12, the CPU 12 updates the contents of a counter from i to i+1. Step T12 is followed by Step T13 to judge whether the original outline data include an original coordinate xi+1 (yi+1). If a positive judgment is made at Step T13, the control of the CPU 12 goes back to Step T8. On the other hand, if a negative judgment is made, the control goes to Step T14 to reset the contents of the counter from i to 0, and further goes to Step T15 to judge whether the x and y coordinate transformations have been ended. If a positive judgment is made at Step T15, the control of the CPU 12 goes to Step T17. On the other hand, if a negative judgment is made, the control goes to Step T16 to read in the data necessary for the y coordinate transformation, similar to Step T1. Following Step T16, the control of the CPU 12 goes back to Step T2 and the following steps. When the control of the CPU 12 reaches Step T15 again, a positive judgment is made, therefore the control goes to Step T17 where the CPU 12 produces dot-matrix data from the transformed outline data including the transformed x and y coordinates.

The original outline data of character "n" has no x coordinate in the original interval numbered 0. No transformation function is determined for the interval numbered 0, because no original x coordinate falls within the interval numbered 0. Since each transformation function F determined is set in the data table of FIG. 14, the function F may be used for transforming a plurality of original x (or y) coordinates falling within a same original interval.

FIG. 14 shows the transformation table used for transforming the respective x coordinates, v, of the original outline data for the character "n" of FIG. 10, into the corresponding x coordinates, v', of the transformed outline data of FIG. 11. Specifically, at Step T11 of FIG. 15, the CPU 12 transforms the x coordinates falling within the interval numbered 1, i.e., interval not smaller than the smaller coordinate wxl0 of the first stroke 120 and smaller than the greater coordinate wxh0 of the first stroke 120, according to the linear function, v'=a1×v+b1; transforms the x coordinates falling within the interval numbered 2, i.e., interval not smaller than the greater coordinate wxh0 of the first stroke 120 and smaller than the smaller coordinate wxl1 of the second stroke 121, according to the linear function, v'=a2×v+b2; transforms the x coordinates falling within the interval numbered 3, i.e., interval not smaller than the smaller coordinate wxl1 of the second stroke 121 and smaller than the greater coordinate wxh1 of the second stroke 121, according to the linear function, v'=a3×v+b3; and transforms the x coordinates falling within the interval numbered 4, i.e., interval not smaller than the greater coordinate wxh1 of the second stroke 121, according to the linear function, v'=a4×v+ b4. Similar transformation operation is effected with respect to the Y axis, i.e., y coordinates of the original outline data of the character "n". However, the outline data for character "n" has no y line spacing data.

The transformed outline data obtained at Step T11 by using the transformation functions F determined at Step T9 and stored at Step T10, are free from quantization errors, because the transformation functions have the characteristics of correcting the quantization errors possibly produced when the original outline data are converted into the transformed outline data.

In the fourth embodiment, too, an output character enjoys an excellent visual effect on the stroke widths thereof even if the scale of the output character reduces.

While the present invention has been described in its preferred embodiments, the present invention may otherwise be embodied.

For example, although the illustrated embodiment relates to the dot-matrix data producing apparatus embodied as the control circuit of the laser printer, it is possible to apply the principle of the invention to other types of printers, and additionally to image displaying devices. Furthermore, the present invention is applicable to any apparatus which produces dot-matrix data from outline data.

Although in the illustrated embodiment the corrected spacing data table of FIG. 5 stored in the ROM 111 are commonly used for all the sets of character data stored in the ROM 13, an exclusive corrected spacing data table may be prepared commonly for a specific group of characters, or differently for each of the characters. Otherwise, different corrected spacing data tables may be used for the x line-spacing data and the y line-spacing data, respectively.

The present invention is applicable to character data including a different type of line-spacing data than the specific type of line-spacing data described in the illustrated embodiments, so long as the line-spacing data can represent the position and width of a stroke of a character to be adjusted. For example, a set of line-spacing data may consist of a single x or y coordinate representing one of the respective positions of two opposed outline segments defining a stroke of a character, and an original width value of the stroke, i.e., distance between the two positions of the two opposed outline segments.

Figure 16:
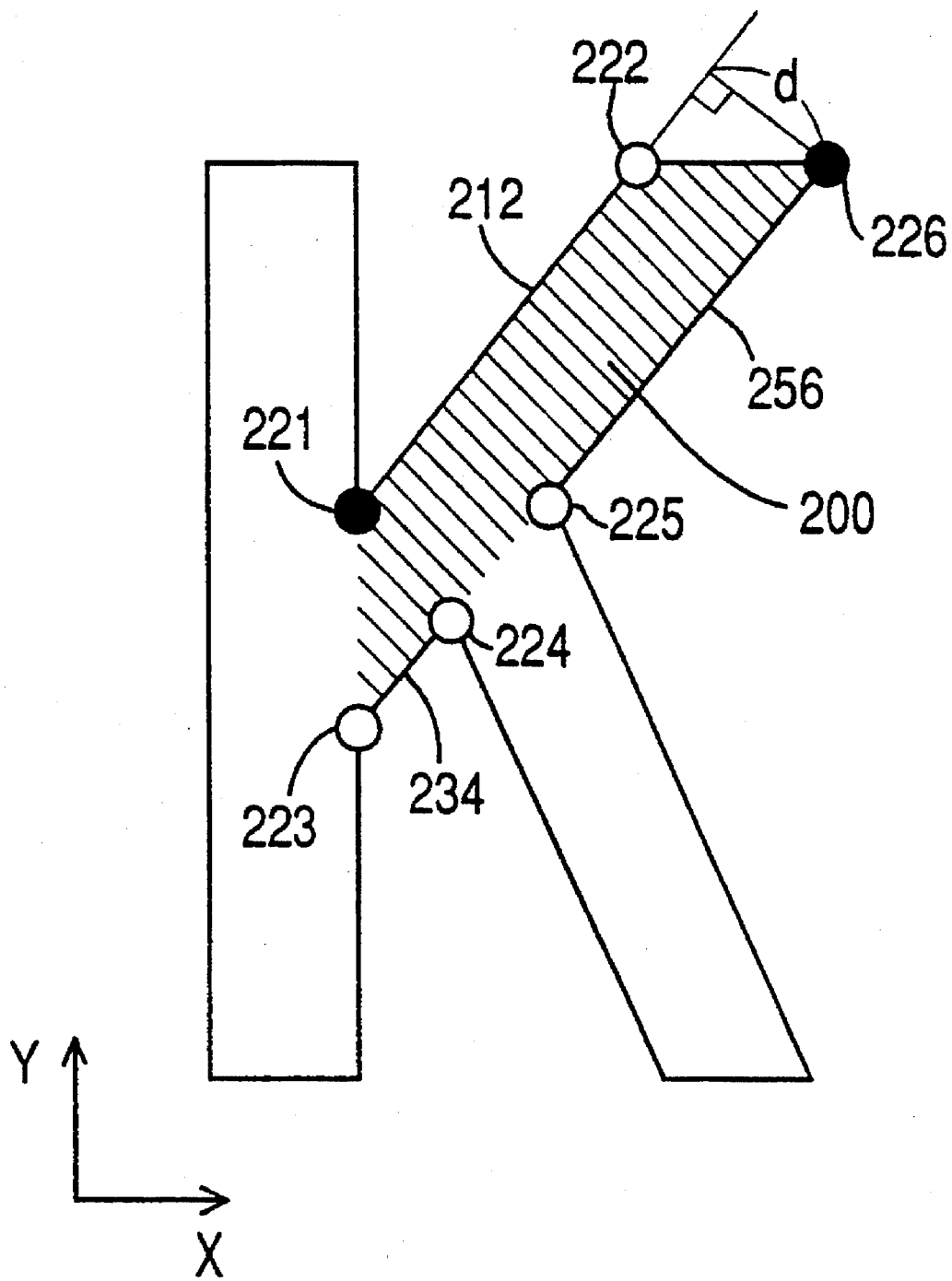
FIG. 16 is a view corresponding to FIG. 2, for explaining the outline data of character "K"
Figure 17:
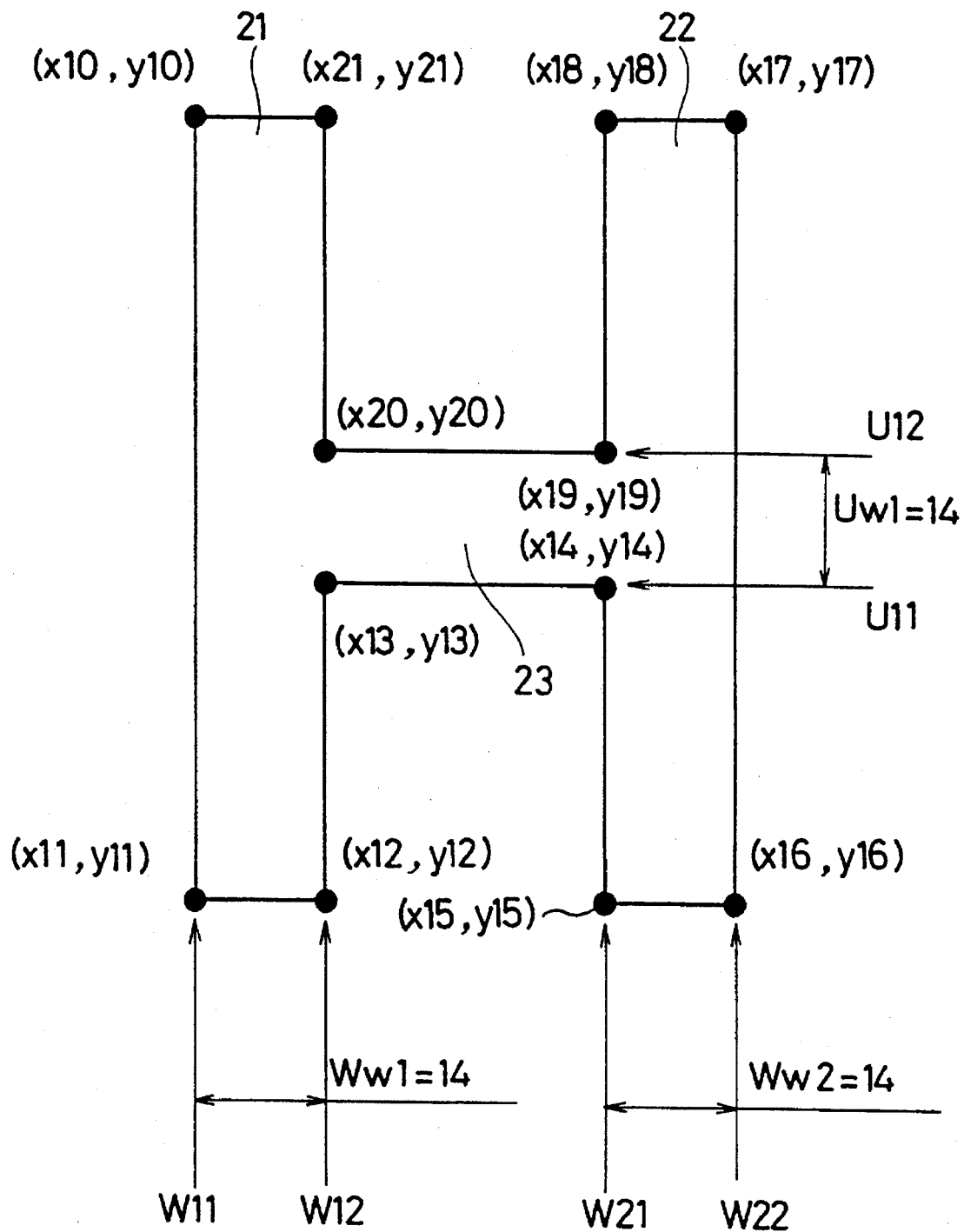
FIG. 17 is a view for explaining outline data defining the outline of a character, "H"
Figure 18:
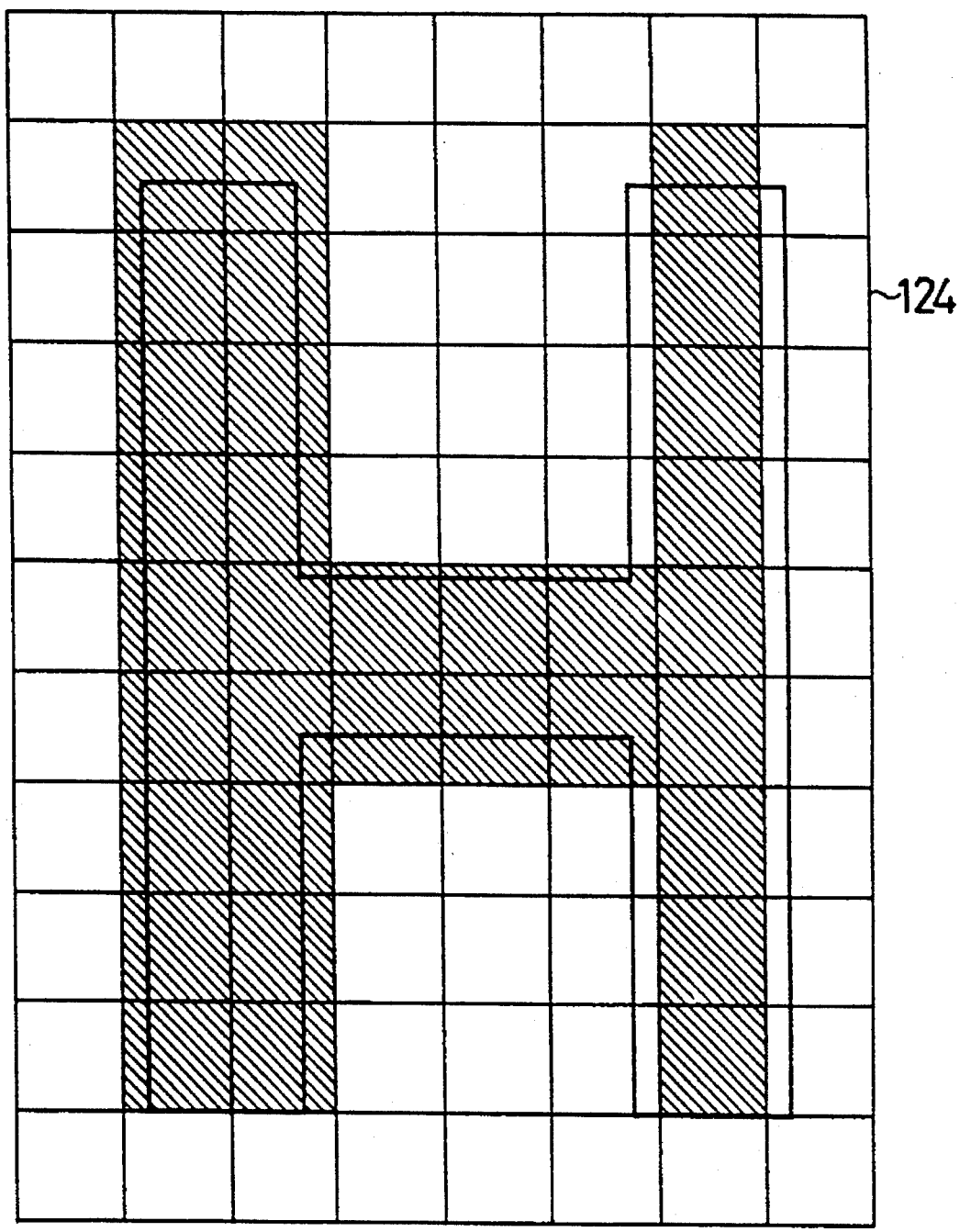
FIG. 18 is a view for explaining the dot-matrix data of character "H" produced from the outline data of FIG. 17 by a conventional device.
Figure 19:
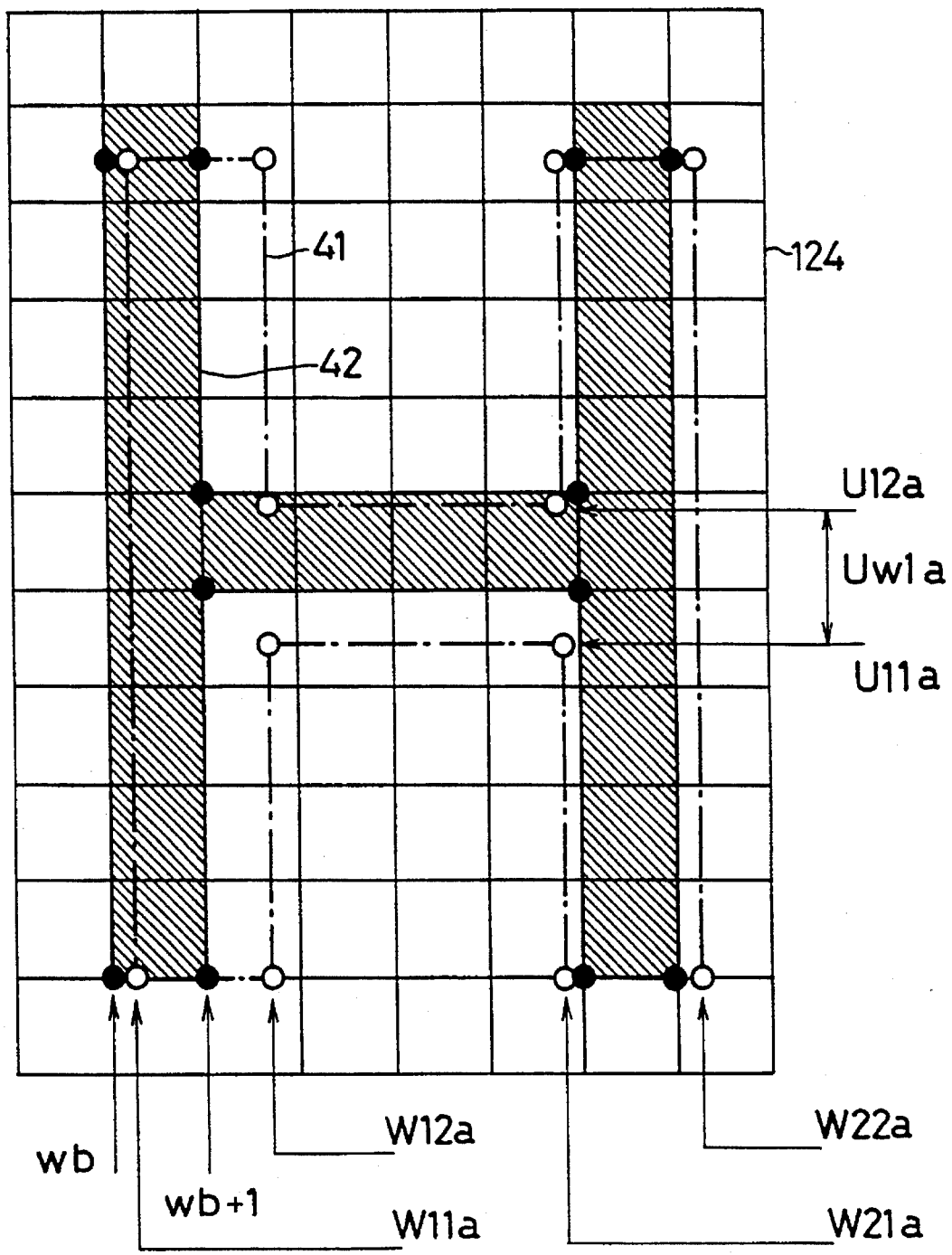
FIG. 19 is a view for explaining the dot-matrix data of character "H" produced from the outline data of FIG. 17 by another conventional device in a manner that the outline data are transformed and the transformed outline data are corrected with respect to the width of a stroke of the character.
Figure 20:
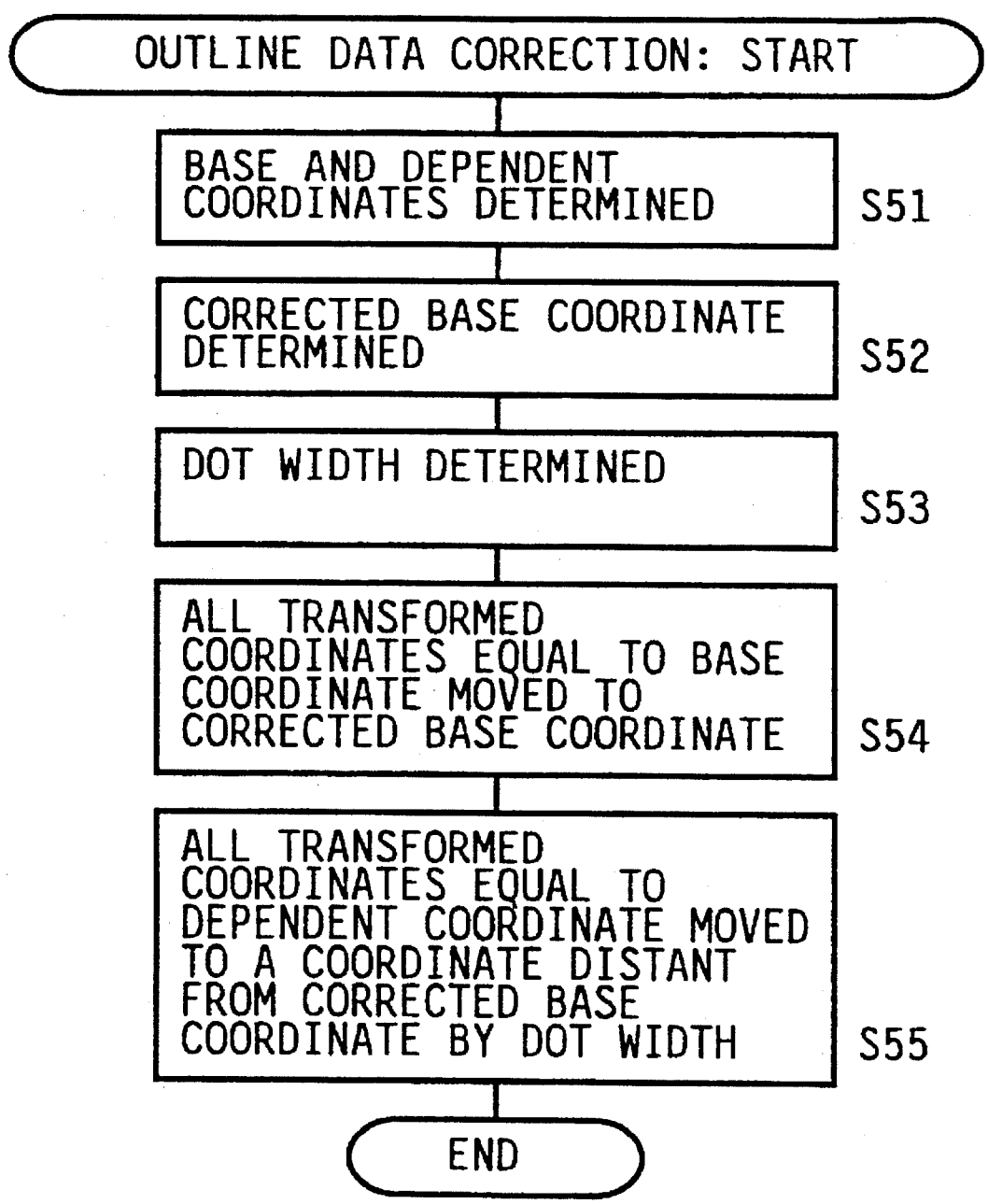
FIG. 20 is a flow chart representing a dot-matrix data production routine employed by the conventional device.
Figure 21:
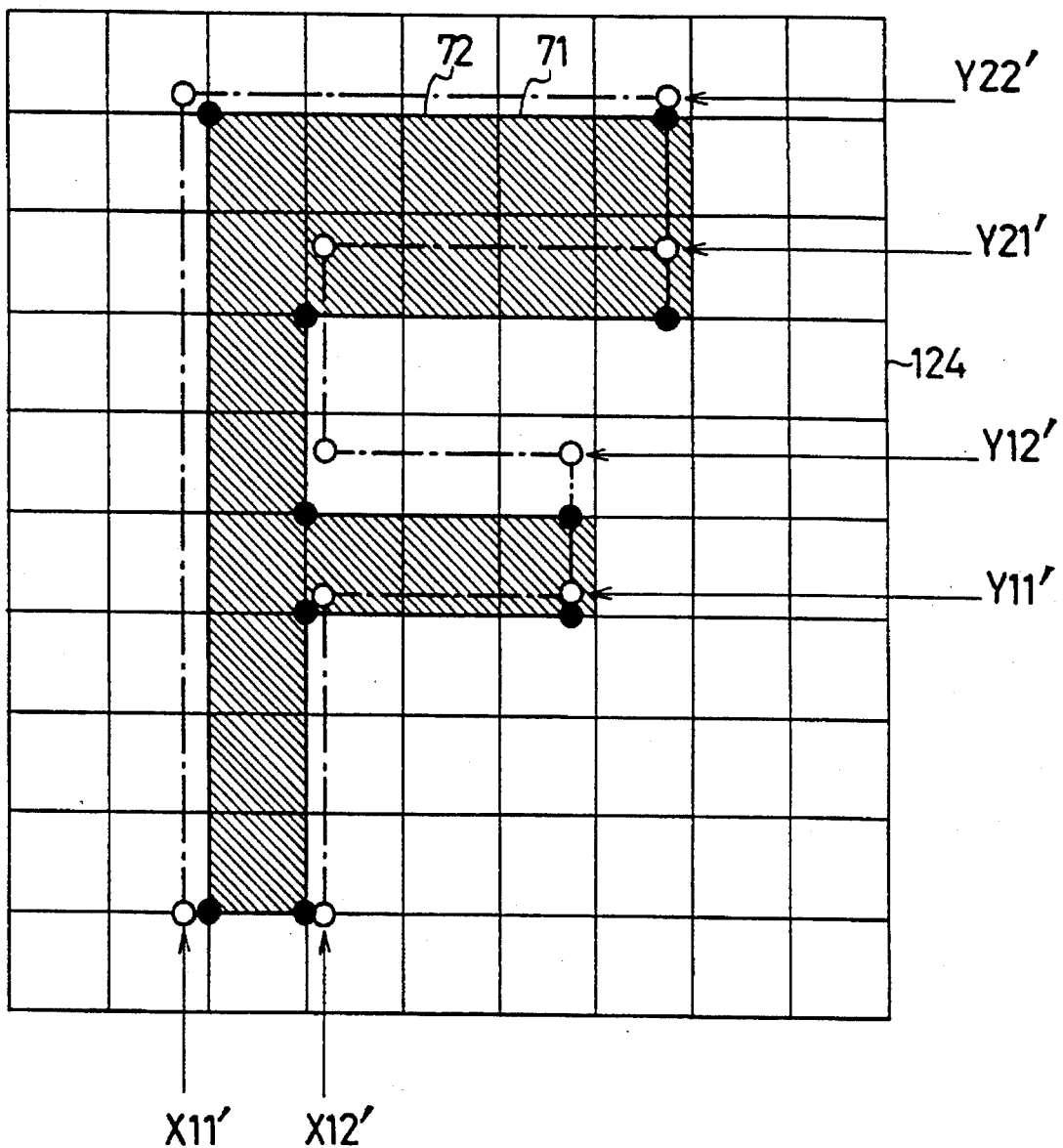
FIG. 21 is a view for explaining the dot-matrix data of character "F" produced from the outline data of FIG. 2 by the conventional device.

Furthermore, the present invention is not limited to the specific manner of correction of the provisional transformed outline data carried out at Step S4, i.e., manner specified in the related art statement. The present invention is applicable to any manner of correcting transformed outline data according to pre-set data. For example, FIG. 16 shows the outline of a character "K" including an oblique stroke 200 whose width is to be adjusted. The character data ROM 13 stores, for the character "K", original outline data defining the outline of the character and a set of oblique line-spacing data for the oblique stroke 200. The oblique line-spacing data include four sets of x and y coordinates for four defining points 221, 222, 223, 226. The two points 221, 222 define a straight segment 212 as a portion of the character outline; the point 223 cooperates with a defining point 224 to define a straight segment 234; and the point 226 cooperates with a defining point 225 to define a straight segment 256. The two points 226 and 222 are associated with each other such that the point 226 is a base point and the point 222 is a dependent point depending from the base point 226. Similarly, the two points 223 and 221 are associated with each other such that the point 221 is a base point and the point 223 is a dependent point depending from the base point 221. Each of the dependent points 222, 223 is associated with direction data indicative of a direction in which that dependent point is moved when the provisional transformed character outline is corrected using a corrected with value of the oblique stroke 200. For example, the dependent point 222 is associated with direction data indicative of the x direction; and the dependent point 223 is associated with direction data indicative of the y direction. The CPU 12 calculates an original width, d, of the oblique stroke 200 based on the four sets of x and y coordinates for the four points 221, 222, 223,226, and finds a corrected width value corresponding to a desired output size and the calculated original width d, in the corrected spacing data table of FIG. 5. After the original outline data of character "K" has been transformed into the provisional transformed outline data, the provisional transformed point corresponding to the original dependent point 222 is moved in the x direction relative to the provisional transformed point corresponding to the original base point 226 so that the two provisional transformed segments corresponding the original segments 212 and 256 (234) is distant from each other by the corrected width value selected from the table of FIG. 5. Thus, the two provisional transformed points 226, 222 are changed to the two proper transformed, i.e., corrected points. Similarly, the provisional transformed point corresponding to the original dependent point 223 is moved in the y direction relative to the provisional transformed point corresponding to the original base point 221 so that the two provisional transformed segments corresponding the two original segments 212 and 234 (256) are distant from each other by the corrected width value. The provisional transformed points corresponding to the original points 224, 225 are moved so as to be located on a straight line passing through the two corrected points 226 and 223, in the respective directions defined by direction data associated with those points 224, 225.

It is to be understood that the present invention may be embodied with other changes, improvements, and modifications that may occur to those skilled in the art without departing from the scope and spirit of the invention defined in the appended claims.

What is claimed is:

1. An apparatus for transforming original outline data defining at least one original outline of an original character, according to scale data indicative of a scale of an output character corresponding to the original character, into transformed outline data defining at least one transformed outline of the output character, and for producing dot-matrix data from the transformed outline data, the apparatus comprising:

first transforming means for transforming, according to said scale data indicative of said scale of said output character within a first range of scale values, said original outline data including at least one set of original width data indicative of an original width of a reference stroke of said original character defined by two opposed segments of said at least one original outline of the original character, into said transformed outline data including at least one set of first transformed width data indicative of a first transformed width of said reference stroke, according to a first relationship between transformed width values and scale values wherein said transformed width values increase as said scale values increase;

second transforming means for transforming, according to said scale data indicative of said scale of said output character within a second range of scale values smaller than said first range of scale values, said original outline data including said at least one set of original width data into said transformed outline data including at least one set of second transformed width data indicative of a second transformed width of said reference stroke, according to a second relationship between at least one transformed width value and the second-range scale values wherein each of said at least one transformed width value corresponds to the scale values within a corresponding one of at least one sub-range of scale values within said second range of scale values; and dot-matrix data producing means for producing said dot-matrix data from said transformed outline data including said first or second transformed width data, according to a predetermined rule, said dot-matrix data including a plurality of sets of inside data substantially defining an inside area of said transformed outline of said output character defined by said transformed outline data and a plurality of sets of outside data substantially defining an outside area of said transformed outline of said output character.

2. An apparatus according to claim 1, wherein said second transforming means comprises means for directly transforming, according to said scale data indicative of said scale of said output character within said second range of scale values, said at least one set of original width data into said at least one set of second transformed width data according to said second relationship.

3. An apparatus according to claim 1, wherein said second transforming means comprises:

means for transforming, according to said scale data indicative of said scale of said output character within said second range of scale values, said at least one set of original width data into at least one set of provisional transformed width data indicative of a provisional transformed width of said reference stroke, according to said second relationship; and means for transforming, according to said scale data, said at least one set of provisional transformed width data into said at least one set of second transformed width data according to said first relationship.

4. An apparatus according to claim 1, wherein said second transforming means comprises:

means for transforming, according to said scale data indicative of said scale of said output character within said second range of scale values, said at least one set of original width data into at least one set of provisional transformed width data indicative of a provisional transformed width of said reference stroke, according to said first relationship; and means for transforming, according to said scale data, said at least one set of provisional transformed width data into said at least one set of second transformed width data according to said second relationship.

5. An apparatus according to claim 1, wherein said second transforming means comprises means for transforming, according to said scale data indicative of said scale of said output character within said second range of scale values, said at least one set of original width data indicative of said original width of said reference stroke within a predetermined range of original width values, into said at least one set of second transformed width data, according to said second relationship between said at least one transformed width value and said second-range scale values wherein said each of said at least one transformed width value corresponds to the scale values within said corresponding one of said at least one sub-range of scale values within said second range of scale values and simultaneously corresponds to the original width values within a corresponding one of at least one sub-range of original width values within said predetermined range of original width values.

6. An apparatus according to claim 5, further comprising a second transformed width data memory which stores a data table representing said second relationship comprising (A) (a1) said second range of scale values grouped into said at least one sub-range of scale values, (A) (a2) said predetermined range of original width values grouped into said at least one sub-range of original width values for each of said at least one sub-range of scale values, and (B) one said transformed width value for each of said at least one sub-range of original width values.

7. An apparatus according to claim 1, wherein said second transforming means comprises:

means for transforming, according to said scale data indicative of said scale of said output character within said second range of scale values, said at least one set of original width data indicative of said original width of said reference stroke within a predetermined range of original width values, into at least one set of provisional transformed width data indicative of a provisional transformed width of said reference stroke, according to said first relationship; and means for transforming said at least one set of provisional transformed width data into said at least one set of second transformed width data according to said second relationship between said at least one transformed width value and said second-range scale values wherein said each of said at least one transformed width value corresponds to the scale values within said corresponding one of said at least one sub-range of scale values within said second range of scale values and simultaneously corresponds to provisional transformed width values within a corresponding one of at least one sub-range of provisional transformed width values within a predetermined range of provisional transformed width values.

8. An apparatus according to claim 7, further comprising a second transformed width data memory which stores a data table representing said second relationship comprising (A) (a1) said second range of scale values grouped into said at least one sub-range of scale values, (A) (a2) said predetermined range of original width values grouped into at least one sub-range of original width values for each of said at least one sub-range of scale values, and (B) one said transformed width value for each of said at least one sub-range of original width values.

9. An apparatus according to claim 8, wherein said second transforming means comprises means for transforming, according to said scale data indicative of said scale of said output character within said second range of scale values, said at least one sub-range of original width values within said predetermined range of original width values, into said at least one sub-range of provisional transformed width values within said predetermined range of provisional transformed width values, according to said first relationship.

10. An apparatus according to claim 1, further comprising judging means for judging whether said scale data are indicative of said scale of said output character within said second range of scale values, so that when said judging means makes a negative judgment said dot-matrix data producing means produces said dot-matrix data from said transformed outline data including said first transformed width data provided by said first transforming means, and so that when said judging means makes a positive judgment said dot-matrix data producing means produces said dot-matrix data from said transformed outline data including said second transformed width data provided by said second transforming means.

11. An apparatus according to claim 1, wherein said second transforming means comprises:

provisional transformation means for transforming, according to said scale data indicative of said scale of said output character within said second range of scale values, said original outline data including said at least one set of original width data, into provisional transformed outline data including at least one set of provisional transformed width data indicative of a provisional transformed width of said reference stroke, according to said first relationship; and correcting means for correcting, by utilizing each of said at least one set of second transformed width data in place of a corresponding one of said at least one set of provisional transformed width data, said provisional transformed outline data into said transformed outline data defining said at least one transformed outline of said output character.

12. An apparatus according to claim 11, wherein said provisional transformation means comprises coordinate transformation means for transforming said original outline data defining said at least one original outline of said original character in a two-dimensional coordinate system provided by an X axis and a Y axis perpendicular to each other, and including a plurality of original sets of x and y coordinates which cooperate with each other to define said original outline of said original character, into said provisional transformed outline data including a plurality of provisional transformed sets of x and y coordinates.

13. An apparatus according to claim 12, wherein said coordinate transformation means comprises function means for transforming said original outline data including said original width data into said provisional transformed outline data including said provisional transformed width data according to a predetermined function equation, said original width data comprising at least two values, v, of (A) (a1) one of the two original x coordinates of the two original sets of x and y coordinates representing respective original positions of said two opposed segments defining said reference stroke, (A) (a2) the other original x coordinate of said two original sets of x and y coordinates, (A) (a3) an original width between said two original x coordinates of said two original sets of x and y coordinates, (B) (b1) one of the two original y coordinates of said two original sets of x and y coordinates, (B) (b2) the other original y coordinate of said two original sets of x and y coordinates, and (B) (b3) an original width between said two original y coordinates of said two original sets of x and y coordinates, said provisional transformed width data comprising at least two values, v', of (C) (c1) one of the two provisional transformed x coordinates of the two provisional transformed sets of x and y coordinates representing respective provisional transformed positions of said two opposed segments defining said reference stroke, (C) (c2) the other provisional transformed x coordinate of said two provisional transformed sets of x and y coordinates, (C) (c3) a provisional transformed width between said two provisional transformed x coordinates of said two provisional transformed sets of x and y coordinates, (D) (d1) one of the two provisional transformed y coordinates of said two provisional transformed sets of x and y coordinates, (D) (d2) the other provisional transformed y coordinate of said two provisional transformed sets of x and y coordinates, and (D) (d3) a provisional transformed width between said two provisional transformed y coordinates of said two provisional transformed sets of x and y coordinates.

14. An apparatus according to claim 13, wherein said function means comprises linear function means for transforming said original sets of x and y coordinates of said original outline data and said at least two values v of said original width data, into said provisional transformed sets of x and y coordinates of said provisional transformed outline data and said at least two values v' of said provisional transformed width data, according to a linear function, $v' = Z \times v + T$, where a transformation coefficient, Z, is defined by said scale data indicative of said scale of said output character with respect to at least one of (a) said X axis and (b) said Y axis and a constant, T, is a parallel-translation amount of said output character with respect to said at least one of (a) said X axis and (b) said Y axis.

15. An apparatus according to claim 14, wherein said linear function means transforms said original outline data including said original width data data into said provisional transformed outline data including said provisional transformed width data, according to said linear function, v'=Z× v+T, with respect to each of (a) said X axis and (b) said Y axis, such that said transformation coefficient Z is defined by a following expression:

Z=(p×d)/(I×e)

where p is a size of said output character defined by said scale data;

d is a resolution of said output character defined by said dot-matrix data;

e is a size of said original character defined by said original outline data; and I is a constant, so that each of said sets of inside data and said sets of outside data of said dot-matrix data corresponds to a square unit area whose four vertices are defined by two adjacent provisional transformed x integral coordinates, x' and x'+ 1, and two adjacent provisional transformed y integral coordinates, y' and y'+1.

16. An apparatus according to claim 15, wherein said resolution d is equal to said constant I and therefore said transformation coefficient Z is equal to a scale, p/e, of said output character, so that said each of said sets of inside data and said sets of outside data of said dot-matrix data corresponds to a square unit area whose four vertices are defined by two adjacent original x integral coordinates, x and x+1, and two adjacent original y integral coordinates, y and y+1.

17. An apparatus according to claim 13, wherein said correcting means of said second transforming means comprises rounding and changing means for correcting at least one of (a) said two provisional transformed x coordinates and (b) said two provisional transformed y coordinates of said provisional transformed width data, into at least one of (a) two corrected x coordinates corresponding to said two provisional transformed x coordinates and (b) two corrected y coordinates corresponding to said two provisional transformed y coordinates, according to a predetermined rule wherein one of the two provisional transformed x or y coordinates out of (a) said two provisional transformed x coordinates and (b) said two provisional transformed y coordinates which one provisional transformed coordinate satisfies a predetermined rounding condition regarding one of a number of reference coordinates equidistant from one another by a unit distance with respect to a corresponding one of said at least one of (a) said X axis and (b) said Y axis, is rounded to said one reference coordinate, said one reference coordinate providing one of the two corrected coordinates corresponding to said two provisional transformed coordinates.

18. An apparatus according to claim 17, wherein said rounding and changing means rounds said one of said two provisional transformed coordinates which satisfies said predetermined rounding condition such that said one provisional transformed coordinate has a smaller distance up to one nearest thereto of said reference coordinates than that of the other of said two provisional transformed coordinates.

19. An apparatus according to claim 17, wherein said correcting means comprises means for correcting said provisional transformed outline data into said transformed outline data defining said at least one transformed outline of said output character, by changing all the provisional transformed coordinates of said provisional transformed outline data which are equal to said one of said two provisional transformed x or y coordinates out of (a) said two provisional transformed x coordinates and (b) said two provisional transformed y coordinates, to said one reference coordinate as said one of said two corrected coordinates corresponding to said two provisional transformed coordinates, and changing all the provisional transformed coordinates of said provisional transformed outline data which are equal to the other of said two provisional transformed coordinates, to another of said reference coordinates distant from said one reference coordinate by said second transformed width defined by said second transformed width data in place of said provisional transformed width defined by said provisional transformed width data.

20. An apparatus according to claim 12, wherein said dot-matrix data producing means comprises means for producing said dot-matrix data from said transformed outline data according to said predetermined rule wherein, when a center of each of a number of rectangular unit areas each of which is defined by (a) adjacent two of a number of reference x coordinates equidistant from one other by a first unit distance with respect to said X axis and (b) by adjacent two of a number of reference y coordinates equidistant from one other by a second unit distance with respect to said Y axis, falls inside said transformed outline of said output character defined by said transformed outline data, said each rectangular unit area is defined by one said set of inside data and, when not, said each rectangular unit area is defined by one said set of outside data, said first unit distance being equal to a distance between two provisional transformed x integral coordinates, said second unit distance being equal to a distance between two provisional transformed y integral coordinates, said second transformed width defined by said second transformed width data corresponding to an integral number of said rectangular unit areas.

21. An apparatus according to claim 1, wherein said second transforming means comprises:

provisional transformation means for transforming, according to said scale data indicative of said scale of said output character within said second range of scale values, at least one set of original position data representing respective original positions of said two opposed segments defining said reference stroke of said original character, and thereby providing at least three original intervals with respect to at least one of an X axis and a Y axis which is perpendicular to said X axis and cooperates with said X axis to provide a two-dimensional coordinate system in which said original outline data define said at least one original outline of said original character, into at least one set of provisional transformed position data defining at least three provisional transformed intervals with respect to said at least one of said X axis and said Y axis;

correcting means for correcting, by utilizing said at least one set of second transformed width data, said at least one set of provisional transformed position data into at least one set of corrected position data defining at least three corrected intervals with respect to said at least one of said X axis and said Y axis;

function determining means for determining, based on said original position data and said corrected position data, a transformation function for each of at least one of said original intervals; and coordinate transformation means for transforming said original outline data comprising a plurality of original sets of x and y coordinates which cooperate with each other to define said at least one original outline of said original character, into said transformed outline data comprising a plurality of transformed sets of x and y coordinates which cooperate with each other to define said at least one transformed outline of said output character, said coordinate transformation means transforming at least one of (a) an x coordinate and (b) a y coordinate of at least one said original set of x and y coordinates within said each of said at least one of said original intervals, into at least one of (a) an x coordinate and (b) a y coordinate of at least one said transformed set of x and y coordinates within a corresponding one of said corrected intervals, according to said transformation function for said each original interval.

22. An apparatus according to claim 21, wherein said provisional transformation means comprises function means for transforming said original position data into said provisional transformed position data according to a predetermined function equation, said original position data comprising at least two values, v, of (A) (a1) one of the two original x coordinates of the two original sets of x and y coordinates representing said respective original positions of said two opposed segments defining said reference stroke, (A) (a2) the other original x coordinate of said two original sets of x and y coordinates, (A) (a3) an original width between said two original x coordinates of said two original sets of x and y coordinates, (B) (b1) one of the two original y coordinates of said two original sets of x and y coordinates, (B) (b2) the other original y coordinate of said two original sets of x and y coordinates, and (B) (b3) an original width between said two original y coordinates of said two original sets of x and y coordinates, said provisional transformed position data comprising at least two values, v', of (C) (c1) one of two provisional transformed x coordinates of two provisional transformed sets of x and y coordinates representing respective provisional transformed positions of said two opposed segments defining said reference stroke, (C) (c2) the other provisional transformed x coordinate of said two provisional transformed sets of x and y coordinates, (C) (c3) a provisional transformed width between said two provisional transformed x coordinates of said two provisional transformed sets of x and y coordinates, (D) (d1) one of the two provisional transformed y coordinates of said two provisional transformed sets of x and y coordinates, (D) (d2) the other provisional transformed y coordinate of said two provisional transformed sets of x and y coordinates, and (D) (d3) a provisional transformed width between said two provisional transformed y coordinates of said two provisional transformed sets of x and y coordinates.

23. An apparatus according to claim 22, wherein said correcting means of said second transforming means comprises means for correcting, by utilizing said second transformed width data, at least one of (a) said two provisional transformed x coordinates and (b) said two provisional transformed x coordinate of said provisional transformed position data, into said corrected position data comprising at least one of (a) two corrected x coordinates corresponding to said two provisional transformed x coordinates and (b) two corrected y coordinates corresponding to said two provisional transformed y coordinates.

24. An apparatus according to claim 23, wherein said function determining means of said second transforming means comprises means for determining, as said transformation function for said each of said at least one of said original intervals, a linear function, v'=a×v+ b, wherein, when said each original interval has two opposite ends respectively defined by two adjacent original coordinates, p and q, out of (a) at least one said one original x coordinate, (b) at least said other original x coordinate, (c) at least one said one original y coordinate, and (d) at least one said other original y coordinate, constants a, b of said linear function are as follows:

$a=(q'-p')/(q-p)$ $b=(p'\times q-q'\times p)/(q-p)$ where p' and q' are the two corrected coordinates corresponding to said two original coordinates p, q, respectively; and wherein, when said each original interval has only one end defined by one, p, of a greatest and a smallest original coordinate out of (a) at least one said one original x coordinate, (b) at least one said other original x coordinate, (c) at least one said one original y coordinate, and (d) at least one said other original y coordinate, constants a, b of said linear function are as follows:

$a=Z$ $b=p'-p\times Z$ where

Z is a transformation coefficient with respect to said at least one of said X axis and said Y axis, said scale data defining said transformation coefficient; and p' is the corrected coordinate corresponding to said one original coordinate p.

25. An apparatus according to claim 21, further comprising:

a function memory which stores said transformation function determined by said function determining means for said each of said at least one of said original intervals; and judging means for judging, for each of at least one of (a) an x coordinate and (b) a y coordinate of each of said original sets of x and y coordinates, whether said function memory has stored the transformation function determined for one of said original intervals within which interval said each of said at least one of (a) said x coordinate and (b) said y coordinate falls, wherein when said judging means makes a negative judgment said function determining means determines the transformation function for said one of said original intervals within which interval said each of said at least one of (a) said x coordinate and (b) said y coordinate falls and said function memory stores said transformation function determined for said one of said original intervals, and when said judging means makes a positive judgment said coordinate transforming means transforms said each of said at least one of (a) said x coordinate and (b) said y coordinate according to said transformation function determined for said one of said original intervals and stored in said function memory.

26. An apparatus according to claim 21, wherein said dot-matrix data producing means comprises means for producing said dot-matrix data from said transformed outline data according to said predetermined rule wherein, when a center of each of a number of rectangular unit areas each of which is defined by (a) adjacent two of a number of reference x coordinates equidistant from one other by a first unit distance with respect to said X axis and (b) by adjacent two of a number of reference y coordinates equidistant from one other by a second unit distance with respect to said Y axis, falls inside said transformed outline of said output character defined by said transformed outline data, said each rectangular unit area is defined by one said set of inside data and, when not, said each rectangular unit area is defined by one said set of outside data, said first unit distance being equal to a distance between two transformed x integral coordinates, said second unit distance being equal to a distance between two transformed y integral coordinates, said second transformed width defined by said second transformed width data corresponding to an integral number of said rectangular unit areas.

27. An apparatus according to claim 1, wherein said second transforming means comprises means for transforming said at least one original width data for at least one said reference stroke of said original character, said at least one reference stroke comprising at least one of (a) a vertical stroke defined by two opposed vertical straight segments of said at least one original outline of said original character, (b) a horizontal stroke defined by two opposed horizontal straight segments of said original outline, and (c) an oblique stroke defined by two opposed parallel oblique straight segments of said original outline.

28. An apparatus according to claim 1, further comprising an output device which outputs said output character according to said dot-matrix data, said second transformed width defined by said second transformed width data corresponding to an integral number of picture elements of the output character produced by said output device.

29. An apparatus according to claim 28, wherein said output device comprises a printing device which records, on a recording medium, said output character according to said dot-matrix data.

30. An apparatus according to claim 1, further comprising a dot-matrix data memory which stores said dot-matrix data including said sets of inside data and said sets of outside data each set of which corresponds to a picture element of said output character.

31. An apparatus according to claim 1, further comprising an input device which is operable for inputting at least one of (a) said scale data and (b) at least one character code corresponding to at least one set of character data as said original outline data and said original width data for at least one said original character.

32. An apparatus according to claim 31, further comprising a parameter memory which stores said at least one of (a) said scale data and (b) said at least one character code, said scale data comprising size data indicative of a desired size of said output character.

33. An apparatus according to claim 1, further comprising an original-data memory which stores said original outline data including said original width data, said original outline data comprising at least one of (a) a set of point data defining an end point of a straight segment as a portion of said original outline of said original character, and (b) a plurality of sets of point data defining at least one control point and an end point of a Bezier curve as a portion of said original outline.

34. An apparatus according to claim 1, further comprising a transformed width data memory which stores at least one of (a) first data representing said first relationship and (b) second data representing said second relationship.

35. An apparatus according to claim 1, further comprising reading means for reading at least one of said original outline data including said original width data, said scale data, first data representing said first relationship, and second data representing said second relationship.

* * * * *